(12) United States Patent
Goodenough et al.

(10) Patent No.: US 9,492,951 B2
(45) Date of Patent: Nov. 15, 2016

(54) OPHTHALMIC DEVICE MOLDS FORMED FROM WATER-SOLUBLE VINYL ALCOHOL COPOLYMER, OPHTHALMIC DEVICES MOLDED THEREIN, AND RELATED METHODS

(75) Inventors: Neil Goodenough, Southampton (GB); David Robert Morsley, Eastleigh (GB); Ian Bruce, Southampton (GB); Edyta S. Bialek, Southampton (GB); Lee Darren Norris, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 590 days.

(21) Appl. No.: 13/810,313

(22) PCT Filed: Jun. 13, 2011

(86) PCT No.: PCT/GB2011/051103
§ 371 (c)(1),
(2), (4) Date: Mar. 13, 2013

(87) PCT Pub. No.: WO2012/013948
PCT Pub. Date: Feb. 2, 2012

(65) Prior Publication Data
US 2013/0188125 A1   Jul. 25, 2013

Related U.S. Application Data

(60) Provisional application No. 61/369,116, filed on Jul. 30, 2010.

(51) Int. Cl.
*B29D 11/00*   (2006.01)
*G02B 1/04*   (2006.01)
(Continued)

(52) U.S. Cl.
CPC ............... *B29C 33/40* (2013.01); *B29C 45/26* (2013.01); *B29D 11/00009* (2013.01);
(Continued)

(58) Field of Classification Search
CPC ............. B29D 11/00413; B29D 11/00038; B29D 11/00009; G02B 1/043; B29C 33/40
USPC ........... 264/1.32, 1.1, 2.5, 2.6, 219; 425/808
See application file for complete search history.

(56) References Cited

U.S. PATENT DOCUMENTS 3,190,843 A   6/1965 Hofelmann et al.
4,143,949 A   3/1979 Chen
(Continued)

FOREIGN PATENT DOCUMENTS

EP   1882576 A1   1/2008
EP   1930243 A1   6/2008
(Continued)

OTHER PUBLICATIONS

PLastic Technology, "Vinyl Alcohol Polymers Are Moldable and Extrudable" (Jul. 2009) pp. 1-2.*
(Continued)

*Primary Examiner* — Nahida Sultana
(74) *Attorney, Agent, or Firm* — Kilyk & Bowersox, P.L.L.C.

(57) ABSTRACT

Ophthalmic device molds made from at least one water-soluble vinyl alcohol copolymer, ophthalmic devices such as ocular inserts and contact lenses and including silicone hydrogel devices formed using these molds, packaged ophthalmic devices present in a solution comprising the at least one water-soluble vinyl alcohol copolymer, and related methods are described. The methods of manufacturing ophthalmic devices can use wet demolding processes, or wet delensing processes or both wet demolding and wet delensing processes involving dissolving the molds in water or an aqueous solution.

15 Claims, 1 Drawing Sheet

(51) Int. Cl.
  *B29C 33/40* (2006.01)
  *B29C 45/26* (2006.01)
  *B29L 11/00* (2006.01)

(52) U.S. Cl.
  CPC .... *B29D 11/00038* (2013.01); *B29D 11/0048* (2013.01); *B29D 11/00413* (2013.01); *G02B 1/043* (2013.01); *B29K 2823/12* (2013.01); *B29K 2829/04* (2013.01); *B29K 2995/0062* (2013.01); *B29L 2011/0041* (2013.01)

(56) References Cited

U.S. PATENT DOCUMENTS

| | | | |
|---|---|---|---|
| 5,326,505 A | 7/1994 | Adams et al. | |
| 5,502,106 A * | 3/1996 | LaFleur | C08L 101/00 525/165 |
| 5,542,978 A | 8/1996 | Kindt-Larsen et al. | |
| 5,779,943 A | 7/1998 | Enns et al. | |
| 5,789,461 A | 8/1998 | Nicolson et al. | |
| 6,310,116 B1 | 10/2001 | Yasuda et al. | |
| 6,455,235 B1 * | 9/2002 | Kokeguchi | G03C 8/4066 430/351 |
| 6,465,538 B2 | 10/2002 | Lai | |
| 6,511,617 B1 | 1/2003 | Martin et al. | |
| 6,747,090 B2 * | 6/2004 | De Groot | A61L 27/52 522/111 |
| 6,867,245 B2 | 3/2005 | Iwata et al. | |
| 7,320,587 B2 | 1/2008 | Goodenough et al. | |
| 7,540,609 B2 | 6/2009 | Chen et al. | |
| 7,691,916 B2 | 4/2010 | McCabe et al. | |
| 7,750,079 B2 | 7/2010 | Almond et al. | |
| 2003/0002009 A1 * | 1/2003 | Shono | G02C 9/04 351/47 |
| 2003/0235669 A1 * | 12/2003 | Yang | A22C 13/0013 428/36.6 |
| 2004/0191691 A1 * | 9/2004 | Ohta | B41C 1/1008 430/281.1 |
| 2005/0001348 A1 * | 1/2005 | Kohnen | C08J 3/201 264/211 |
| 2005/0013842 A1 | 1/2005 | Qiu et al. | |
| 2005/0056954 A1 * | 3/2005 | Devlin | B29C 35/0894 264/1.32 |
| 2006/0063852 A1 | 3/2006 | Iwata et al. | |
| 2006/0073185 A1 | 4/2006 | Jani et al. | |
| 2006/0251696 A1 | 11/2006 | Winterton et al. | |
| 2006/0284327 A1 | 12/2006 | Yamamichi | |
| 2007/0035049 A1 | 2/2007 | Bruce et al. | |
| 2007/0138692 A1 | 6/2007 | Ford et al. | |
| 2007/0149428 A1 | 6/2007 | Ammon, Jr. et al. | |
| 2007/0216045 A1 | 9/2007 | Francis | |
| 2007/0269616 A1 * | 11/2007 | Nakano | G02B 5/3033 428/1.31 |
| 2007/0284770 A1 | 12/2007 | Ansell et al. | |
| 2008/0001317 A1 | 1/2008 | Tokarski et al. | |
| 2008/0029914 A1 | 2/2008 | Hamanaka | |
| 2008/0239237 A1 | 10/2008 | Ansell et al. | |
| 2008/0290534 A1 | 11/2008 | Yin et al. | |
| 2008/0307751 A1 | 12/2008 | Newman et al. | |
| 2009/0121370 A1 | 5/2009 | Barrows et al. | |
| 2009/0146329 A1 | 6/2009 | Yin et al. | |
| 2009/0166904 A1 | 7/2009 | Lawton et al. | |
| 2009/0244445 A1 * | 10/2009 | Nakamura | B29C 43/222 349/96 |
| 2009/0317616 A1 * | 12/2009 | Kawai | C09B 59/00 428/220 |
| 2011/0060445 A1 | 3/2011 | Heenan | |
| 2013/0161846 A1 * | 6/2013 | Goodenough | B29C 33/40 264/2.5 |
| 2013/0162943 A1 | 6/2013 | Goodenough et al. | |
| 2013/0169926 A1 | 7/2013 | Goodenough et al. | |
| 2013/0169927 A1 | 7/2013 | Goodenough et al. | |
| 2013/0176530 A1 | 7/2013 | Goodenough et al. | |
| 2013/0250406 A1 * | 9/2013 | Nakajima | G02B 5/282 359/359 |
| 2015/0224724 A1 * | 8/2015 | Irizarry Martell | B29D 11/00125 264/2.7 |

FOREIGN PATENT DOCUMENTS

| | | |
|---|---|---|
| EP | 2181836 A2 | 5/2010 |
| GB | 2481761 B | 9/2012 |
| GB | 2485015 B | 12/2012 |
| JP | 5549288 B2 | 12/1980 |
| JP | 63-046232 | 2/1988 |
| JP | 11-172149 | 6/1999 |
| JP | 11-287971 | 10/1999 |
| JP | 2004-075866 | 3/2004 |
| JP | 2004314416 A | 11/2004 |
| JP | 2006-089538 | 4/2006 |
| JP | 2009-542470 A | 12/2009 |
| WO | 0117756 A1 | 3/2001 |
| WO | 0170490 A2 | 9/2001 |
| WO | 2008-002398 A2 | 1/2008 |
| WO | 2008005201 A2 | 1/2008 |
| WO | 2008021822 A3 | 2/2008 |
| WO | 2009025845 A1 | 2/2009 |
| WO | 2010011492 A1 | 1/2010 |
| WO | 2010011493 A1 | 1/2010 |
| WO | 2010065686 A1 | 6/2010 |
| WO | 2010078150 A1 | 7/2010 |

OTHER PUBLICATIONS

Office Action received in Japanese Patent Application No. 2013-522298 dated Oct. 16, 2014 with English translation (10 pages).
Office Action received in Japanese Patent Application No. 2013-522299 dated Nov. 5, 2014 with English translation (6 pages).
Technical data sheet for DMS-R18 from Gelest, 1 page, undated, (2015).
International Search Report and Written Opinion issued in corresponding International Patent Application No. PCT/GB2011/051103 dated Nov. 15, 2011.
International Preliminary Report on Patentability issued in corresponding International Patent Application No. PCT/GB2011/051103 dated Oct. 4, 2012.
Office Action received in corresponding Japanese Patent Application No. 2013-521213 dated May 12, 2014 with English translation (12 pages).
Lai et al., "Surface wettability enhancement of silicone hydrogel lenses by processing with polar plastic molds," J. Biomed Mater Res., 35, 1997, pp. 349-356.
Hassan et al., "Structure and Applications of Poly(vinyl alcohol) Hydrogels Produced by Conventional Crosslinking or by Freezing/Thawing Methods," Advances in Polymer Science, vol. 153, Springer-Verlag Berlin Heidelberg 2000, pp. 37-65.
Hodgkinson et al., "Thermoplastic Poly (Vinyl Alcohol) (PVOH)," Materials World, vol. 8, pp. 24-25, Apr. 2000.
"Nichigo G-Polymer—Biodegradable, High Barrier, Water Soluble, Extrusion Polymer," 2010 Place Conference, Apr. 18-21, 2010, Albuquerque, New Mexico USA.
Tohei Moritani, "Molecular Structures and Functional Modifications of Poly(Vinyl Alcohol)," May 1998 (14 pages).
Extracts from Gohsenol.com (Nippon Gohsei), printed from<http://www.gohsenol.com/doc_e/spcl/spcl_01/spcl_11.shtml> on Apr. 28, 2015, (6 pages).
Keeping Up With Technology—Vinyl Alcohol Polymers Are Moldable and Extrudable, Plastics Technology, Jul. 2009, Gardner Business Media, Inc. Cincinnati Ohio.
Notice of Opposition received in corresponding European Patent No. 2598320 dated May 12, 2015 (21 pages).
Addendum to Notice of Opposition filed in corresponding European Patent No. 2598320 dated Apr. 30, 2015 (2 pages).
Office Action received in corresponding Great Britain (United Kingdom) Patent No. GB2495674 dated Nov. 13, 2013 (2 pages).

(56) References Cited

OTHER PUBLICATIONS

Office Action received in corresponding Chinese Patent Application No. 201180037154.2 dated Jul. 27, 2016 with English translation (19 pages).

Shibutani et al., "Plastics Age," vol. 55, Jul. 2009, pp. 82-86 (relevance at pp. 2, 4, and 5 of English translation of Chinese Office Action).

* cited by examiner

OPHTHALMIC DEVICE MOLDS FORMED FROM WATER-SOLUBLE VINYL ALCOHOL COPOLYMER, OPHTHALMIC DEVICES MOLDED THEREIN, AND RELATED METHODS

This application is a National Stage Application of PCT/GB2011/051103, filed Jun. 13, 2011, which claims priority to U.S. Provisional Patent Application No. 61/369,116, filed Jul. 30, 2010.

FIELD

The present disclosure relates to ophthalmic device molds comprising a water-soluble vinyl alcohol copolymer, ophthalmic devices including ocular inserts and contact lenses cast molded using a mold formed from a water-soluble vinyl alcohol copolymer, a packaged ophthalmic device, and related methods.

BACKGROUND

In cast molding methods of producing ophthalmic devices, such as ocular inserts and contact lenses, a reaction mixture or polymerizable composition is commonly cured in a device-shaped cavity defined by a first mold member with a device-forming molding surface and a second mold member with a device-forming molding surface, or a female and male mold member, respectively. The mold members are typically produced by injection molding a thermoplastic polymer into mold-shaped cavities. Examples of thermoplastic polymers which can be used to make ophthalmic device molds include non-polar thermoplastic polymers, such as polypropylene, polystyrene, and polyethylene; and polar thermoplastic polymers, such as ethylene-vinyl alcohol copolymers and poly(vinyl alcohol) homopolymers. When cast molding ophthalmic devices, after placing the polymerizable composition in the first mold member, the first and second mold members are placed together or coupled together to form a mold assembly with an ophthalmic device-shaped cavity therebetween. The mold assembly is then cured to polymerize the polymerizable composition, forming the polymeric ophthalmic device in the device-shaped cavity of the mold assembly.

Contact lenses, including silicone hydrogel contact lenses, have been cast molded in molds made of ethylene-vinyl alcohol (EVOH) copolymers, for example SOAR-LITE™ S available from Nippon Gohsei, Ltd., Osaka, Japan. Molding silicone hydrogel lenses in EVOH molds has been found to result in lenses having ophthalmically acceptably wettable surfaces. Previously, it was necessary to apply a surface treatment such as, for example a plasma treatment, or to include an interpenetrating network of a polymeric wetting agent in silicone hydrogel ophthalmic devices in order for the device surfaces to be ophthalmically acceptably wettable when hydrated. However, EVOH is an expensive material which is essentially insoluble in water. The high cost of EVOH molds can negatively impact production costs. Additionally, it can be difficult to release the polymeric ophthalmic device body from EVOH mold members following curing, which can negatively impact device yields and production costs.

It has also been proposed to use poly(vinyl alcohol) homopolymers (PVOH), including modified forms of PVOH, to form ophthalmic device molds, including contact lens molds. The use of ophthalmic device molds which are water-soluble could be particularly useful and cost-effective, as it could simplify the process of releasing the device from the molds while also reducing the possibility of damaging the device during the release process. However, the use of many forms of PVOH has been found not to be ideal for use as ophthalmic device lens molds. For example, as the traditional melt processing temperature and thermal degradation temperature of unmodified PVOH are almost the same, it is very difficult to use these materials to injection mold ophthalmic device molds. Although PVOH is water-soluble, it can be difficult to achieve complete dissolution of the material, particularly at low water temperatures, and solutions of PVOH typically do not exhibit stable viscosities, as they gel readily and crystallize when subjected to high shear conditions.

While some modified forms of PVOH have been proposed for use as ophthalmic device molds, these modified forms of PVOH still retain some of the undesirable properties of unmodified PVOH, such as, for example, high crystalline content that reduces light transmission through the material, slow dissolution in water at lower temperatures, and, when dissolved, significant portions of the material may remain present as undissolvable solids. Further, as with unmodified PVOH, aqueous solutions of modified PVOH can gel or foam easily, and the materials may produce cloudy aqueous solutions due to precipitation of the PVOH material. Although the prospect of an ophthalmic device mold that could be dissolved in water would be attractive, these undesirable properties make it difficult to use either modified or unmodified forms of PVOH in commercial production of ophthalmic devices, including ocular inserts and contact lenses.

In view of the above, it can be appreciated that a need exists for ophthalmic device molds comprising new types of materials for cast molding ophthalmic devices including silicone hydrogel ophthalmic devices, for new ophthalmic devices cast molded using molds comprising these new types of materials, for packaged ophthalmic devices cast molded using molds comprising these new types of materials, and for associated manufacturing methods which use these new types of materials which can be less expensive and more process-friendly. A need exists particularly for water-soluble materials which can be used to form molds suitable for molding contact lenses.

All publications, including patents, published patent applications, scientific or trade publications and the like, cited in this specification are hereby incorporated herein in their entirety.

SUMMARY

In a first example, the present disclosure is directed to a method of manufacturing an ophthalmic device, comprising: providing at least one water-soluble vinyl alcohol copolymer; using the at least one water-soluble vinyl alcohol copolymer to form at least one of a first mold member and a second mold member, the first mold member comprising a molding surface configured to mold an anterior surface of an ophthalmic device and the second mold member comprising a molding surface configured to mold a posterior surface of an ophthalmic device, the first mold member and the second mold member configured to form an ophthalmic device-shaped cavity therebetween when combined as a mold assembly.

A method of the present disclosure can further comprise placing a polymerizable composition comprising at least one hydrophilic monomer in the first mold member or in the second mold member; and assembling the mold assembly by contacting the first mold member and the second mold member so as to form the ophthalmic device-shaped cavity therebetween, with the polymerizable composition contained in the ophthalmic device-shaped cavity of the mold assembly.

A method of the present disclosure can further comprise curing the polymerizable composition in the mold assembly to form a cast-molded polymerized reaction product in the ophthalmic device-shaped cavity of the mold assembly, the polymerized reaction product comprising a polymeric ophthalmic device body.

In one example of the present disclosure, the ophthalmic device can comprise an ocular insert configured to contact an anterior ocular surface, the first mold member can comprise a molding surface configured to mold an anterior surface of an ocular insert, the second mold member can comprise a molding surface configured to mold a posterior surface of an ocular insert, the first mold member and the second mold member can be configured to form an ocular insert-shaped cavity therebetween when combined as a mold assembly, and the polymerized reaction product can comprise a polymeric ocular insert body.

In another example of the present disclosure, the ophthalmic device can comprise a contact lens, the first mold member can comprise a concave molding surface configured to mold an anterior surface of a contact lens, the second mold member can comprise a convex molding surface configured to mold a posterior surface of a contact lens, the first mold member and the second mold member can be configured to form a contact lens-shaped cavity therebetween when combined as a mold assembly, and the polymerized reaction product can comprise a polymeric contact lens body.

In another example, the water-soluble vinyl alcohol copolymer can be a copolymer for which 50 grams or more of the copolymer are visibly soluble in 1 liter of deionized water at 20 degrees C.

In another example, a sample of the water-soluble vinyl alcohol copolymer, when agitated, can dissolve at least 40% (wt/wt) in 1 liter of deionized water at 30 degrees C. in 20 minutes or less.

In another example, a sample of the water-soluble vinyl alcohol copolymer can dissolve in deionized water leaving less than 15% (wt/wt) of the sample remaining as insoluble solids once the soluble portion of the sample has dissolved.

In another example, a solution of the at least one water-soluble vinyl alcohol copolymer can have a viscosity which varies less than about 20% when stored at a temperature of about 90° C. or less over a period of at least about 12 hours.

In another example, the rate of oxygen transmittance through a dry film formed of the water-soluble vinyl alcohol copolymer can be less than 2.0 cc 20μ/m² day atm.

In another example, the level of biodegradability of the water-soluble vinyl alcohol copolymer can be at least 40% after a standing time of about 30 days as determined using test method ISO 14851 with a sample of about 600 ml, about 300 ml of standard testing solution, and a temperature of about 25 degrees C.

In another example, a sample of the dry water-soluble vinyl alcohol copolymer can have a percent haze of less than 30%.

In another example, the at least one water-soluble vinyl alcohol copolymer can have a level of UV light transmittance less than 15%.

In another example, the water-soluble vinyl alcohol copolymer can be a vinyl alcohol copolymer essentially free of ethylene units.

In yet another example, the at least one water-soluble vinyl alcohol copolymer can comprise or consist of NICHIGO G-POLYMER™ (Nippon Gohsei, Osaka, Japan).

A method of the present disclosure can comprise a method wherein the step of placing the polymerizable composition in one of the first mold member or the second mold member comprises placing a polymerizable composition comprising at least one silicon-containing monomer and at least one hydrophilic monomer in the first mold member, and wherein the ophthalmic device body comprises a silicone hydrogel ophthalmic device body.

A method of the present disclosure can comprise a method wherein the step of using the at least one water-soluble vinyl alcohol copolymer to form at least one of the first mold member and the second mold member comprises completely forming a molding surface of at least one of the first mold member and the second mold member by injection molding.

A method of the present disclosure can comprise a method wherein the step of using the at least one water-soluble vinyl alcohol copolymer to form at least one of the first mold member and the second mold member comprises injection molding the at least one of the first mold member and the second mold member, and subsequently lathing at least a portion of a molding surface of the at least one of the first mold member and the second mold member.

The process of injection molding the water-soluble vinyl alcohol copolymer can use a process setting selected from the group consisting of: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar, and any combination thereof. In one example, at least two of the above process settings can be used. In another example, at least three of the above process settings can be used. In yet another example, at least four of the above process settings can be used.

A method of the present disclosure can comprise a method wherein the step of using the at least one water-soluble vinyl alcohol copolymer to form at least one of the first mold member and the second mold member comprises using the at least one water-soluble vinyl alcohol copolymer to form a molding surface on the at least one of the first mold member and the second mold member, a non-molding region of the at least one of the first mold member and the second mold member being formed of a second material, and wherein the step of placing the polymerizable composition in the first mold member or the second mold member comprises placing the polymerizable composition in direct contact with the molding surface comprising the at least one water-soluble vinyl alcohol copolymer.

A method of the present disclosure can comprise a method wherein the ophthalmic device body has ophthalmically acceptably wettable anterior and posterior surfaces without application of a surface treatment to the ophthalmic device body, or without the presence of components in the polymerizable composition that form an interpenetrating network (IPN) or pseudo-IPN of a hydrophilic polymeric wetting agent in the ophthalmic device body during the curing.

A method of the present disclosure can comprise a method wherein the method further comprises the step of separating the mold assembly following the curing, and the separating results in the polymeric ophthalmic device body remaining in contact with one and only one of the first mold member and the second mold member, the one and only one of the first mold member and the second mold member being the at least one of the first mold member and the second mold member comprising the at least one water-soluble vinyl alcohol copolymer, or the separating results in the ophthalmic device body being released from both the first mold member and the second mold member.

A method of the present disclosure can comprise a method wherein the step of separating the cured mold assembly comprises applying a liquid to the at least one of the first mold member and the second mold member comprising the at least one water-soluble vinyl alcohol copolymer, and results in the at least one of the first mold member and the second mold member comprising the at least one water-soluble vinyl alcohol copolymer at least partially dissolving in the liquid.

A method of the present disclosure can comprise a method wherein the method further comprises the step of placing the mold assembly including the polymeric ophthalmic device body in the ophthalmic device-shaped cavity in a blister package with a packaging solution, and sealing and sterilizing the package, wherein the mold assembly is fully dissolved in the packaging solution following sterilization.

The present disclosure is also directed to ophthalmic devices cast molded using one or more mold members formed from at least one of the water-soluble vinyl alcohol copolymers described herein. The ophthalmic devices can be ocular inserts or contact lenses. The ophthalmic devices can be silicone hydrogel ophthalmic devices. The ophthalmic devices can be silicone hydrogel contact lenses.

In one example, the disclosure is directed to a silicone hydrogel contact lens comprising a cast-molded silicone hydrogel polymeric contact lens body comprising the reaction product of a polymerizable composition, the polymerizable composition comprising at least one silicon-containing monomer and at least one hydrophilic monomer; wherein the silicone hydrogel polymeric contact lens body is a cast-molded lens body formed from the polymerizable composition in a mold assembly comprising a first mold member and a second mold member, at least one of the first mold member and the second mold member comprising at least one water-soluble vinyl alcohol copolymer.

The present disclosure is also directed to packaged ophthalmic devices cast molded using one or more mold members formed from at least one of the water-soluble vinyl alcohol copolymers described herein. The packaged ophthalmic devices can be packaged ocular inserts or packaged contact lenses. The packaged ophthalmic devices can be packaged silicone hydrogel ophthalmic devices. The packaged ophthalmic devices can be packaged silicone hydrogel contact lenses.

In one example, the disclosure is directed to a packaged silicone hydrogel contact lens comprising a blister package formed of a hydrophobic polymer material; a cast-molded silicone hydrogel polymeric contact lens body comprising the reaction product of a polymerizable composition, the polymerizable composition comprising at least one silicone monomer and at least one hydrophilic monomer; and a liquid comprising the dissolution product of at least one water-soluble vinyl alcohol copolymer in an ophthalmically acceptable packaging solution.

The present disclosure is also directed to a mold used for cast molding an ophthalmic device, including an ocular insert or a contact lens. The mold can comprise a molding surface and a non-molding region, where at least the molding surface of the mold comprises at least one water-soluble vinyl alcohol copolymer as described herein. The mold can comprise a molding surface, or a mold member, or a mold assembly, or a single-piece mold member configured to mold both an anterior surface and a posterior surface of an ophthalmic device.

Any and all features described herein and any combination of such features are included within the scope of the present application provided that the features of any such combination are not mutually inconsistent. In addition, any feature or combination of features may be specifically excluded from any example of the present disclosure.

DETAILED DESCRIPTION

Figures 1, 2:
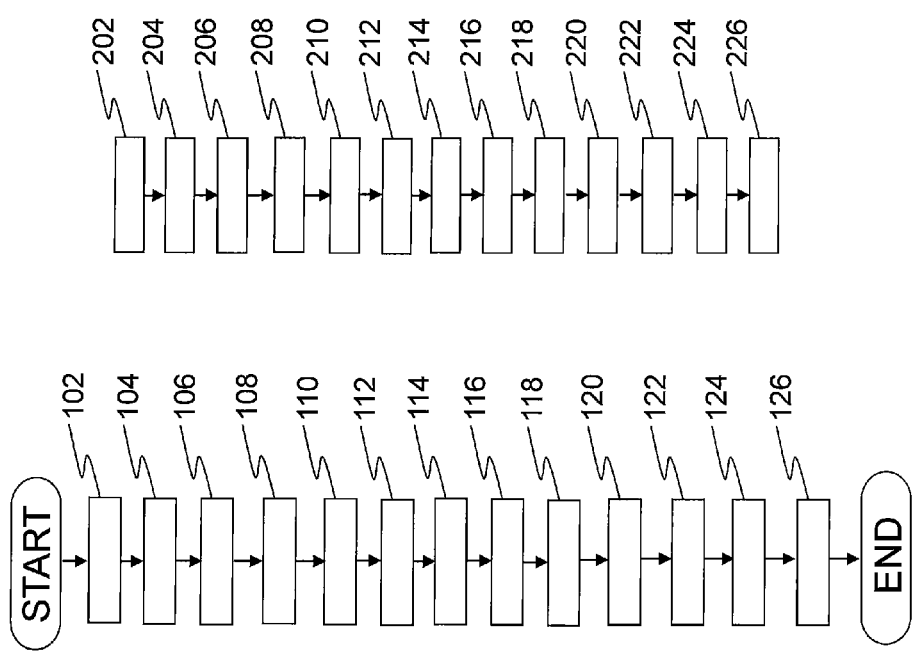
FIG. 1 is a flow chart illustrating steps of a method for producing an ophthalmic device.
FIG. 2 is a flow chart illustrating certain inputs and outputs of the method of FIG. 1.

It has been discovered that ophthalmic device molds, including ocular insert molds and contact lens molds, made of at least one water-soluble vinyl alcohol copolymer can be used to cast mold polymeric ophthalmic device bodies, e.g., polymeric ocular insert device bodies and polymeric contact lens bodies.

As used herein, a vinyl alcohol copolymer is a polymer comprising at least one unit of a vinyl alcohol functional group and units of a functional group which is not a vinyl alcohol. This is distinct from a vinyl alcohol homopolymer, which is a polymer comprising only repeating units of a vinyl alcohol functional group, i.e., poly(vinyl alcohol) (PVOH), or a modified form of PVOH such as a form of PVOH which has been physically combined (i.e., not reacted or co-polymerized) with ingredients such as plasticizers which modify the properties of the PVOH, such as, for example, the melting temperature to allow the PVOH to be injection molded.

As used herein, a "water-soluble vinyl alcohol copolymer" is understood to be a vinyl alcohol copolymer which is visibly soluble in water or an aqueous solution at room temperature (e.g., about 20-25 degrees C.). For example, a water-soluble vinyl alcohol copolymer can be a copolymer for which 50 grams or more of the copolymer are visibly fully soluble in 1 liter of deionized water at 20 degrees C. (i.e., the copolymer is soluble at a level of at least 5% wt/wt in water) as determined using a standard shake flask method as known to persons of ordinary skill in the art. In another example, the water-soluble vinyl alcohol copolymer can be a copolymer for which 100 grams or more of the copolymer are visibly soluble in 1 liter of deionized water at 20 degrees C. In another example, the water-soluble vinyl alcohol copolymer can be a copolymer for which 150 grams or more of the copolymer are visibly soluble in 1 liter of deionized water at 20 degrees C. In yet another example, the water-soluble vinyl alcohol copolymer can be a copolymer for which 200 grams or more of the copolymer are visibly soluble in 1 liter of deionized water at 20 degrees C.

The water-soluble vinyl alcohol copolymer can rapidly dissolve in water or an aqueous solution. In one example, when agitated in 1 liter of deionized water at 30 degrees C., a sample of the water-soluble vinyl alcohol copolymer can dissolve at least 40% (wt/wt) in 20 minutes or less. In another example, when agitated in 1 liter of deionized water at 30 degrees C., a sample of the water-soluble vinyl alcohol copolymer can dissolve at least 50% (wt/wt) in 20 minutes or less. In yet another example, when agitated in 1 liter of deionized water at 30 degrees C., a sample of the water-soluble vinyl alcohol copolymer can dissolve at least 60% (wt/wt) in 20 minutes or less.

In one example, the water-soluble vinyl alcohol copolymer is a copolymer which, when solublized, has a low level of insoluble (i.e., undissolved and undissolvable) solids present in the solution. For example, when a sample of the water-soluble vinyl alcohol copolymer is placed in water or an aqueous solution, following complete dissolution of the soluble portion of the copolymer, only a small portion of solid copolymer material remains. For example, less than about 20% of the amount of copolymer by weight, or less than about 15% of the copolymer by weight, or less than about 10% by weight, or less than about 8% by weight, or less than about 6% of the amount of copolymer by weight, or less than about 5% of the amount of copolymer by weight can remain as insoluble solids.

In one example, the vinyl alcohol copolymer which, when solublized, has a low level of insoluble solids present in solution, can dissolve in water at a temperature from about 30 degrees C. to about 80 degrees C. in less than or equal to 20 minutes to form a 3% (wt/wt) solution of the vinyl alcohol copolymer in water, the solution having a level of insoluble solids of about 10% (wt/wt) or less (i.e., 10% by weight of the sample of copolymer added to the water remains present as insoluble solids present in the solution). In another example, the vinyl alcohol copolymer can dissolve in water at a temperature from about 30 degrees C. to about 80 degrees C. in less than or equal to 20 minutes to form a 6% (wt/wt) solution of the vinyl alcohol copolymer in water, the solution having a level of insoluble solids of about 6% (wt/wt) or less. In yet another example, the vinyl alcohol copolymer can dissolve in water at a temperature from about 30 degrees C. to about 80 degrees C. in less than or equal to 20 minutes to form a 10% (wt/wt) solution of the vinyl alcohol copolymer in water, the solution having a level of insoluble solids of about 15% (wt/wt) or less.

The solutions of the water-soluble vinyl alcohol copolymer formed by dissolving the molds in a liquid may not present manufacturing difficulties such as, for example, excessive foaming, gelation of the liquid, or the liquid becoming cloudy due to undissolved or precipitated copolymer. For example, the water-soluble vinyl alcohol copolymer of the present disclosure can be a water-soluble vinyl alcohol copolymer which forms physically stable aqueous solutions. An aqueous solution of the water-soluble vinyl alcohol copolymer may not gel in solution for over 3 hours, 6 hours, 12 hours, 24 hours, or 48 hours after formation of the solution. An aqueous solution of the at least one water-soluble vinyl alcohol copolymer described herein can have a viscosity which varies less than about 20%, less than about 15%, or less than about 10% when stored at a temperature of about 90° C. or less over a period of at least 12 hours. In another example, a solution of the at least one water-soluble vinyl alcohol copolymer described herein can be highly resistant to precipitating when subjected to high shear. The solution of the at least one water-soluble vinyl alcohol copolymer can retain its initial haze level following mixing in a high shear mixer at 1000 rpm for 30 minutes at 10° C. In another example, the solution of the at least one water-soluble vinyl alcohol copolymer can have a haze level less than +15%, or less than ±10%, or less than ±5% of its initial haze level following mixing in a high shear mixer at 1000 rpm for 30 minutes at 10° C. The aqueous solution of the water-soluble vinyl alcohol copolymer may not foam significantly, i.e., the solution may not foam at a level which becomes disruptive during a "wet" demolding or delensing process.

When formed into a dry film, the water-soluble vinyl alcohol copolymer can have a low rate of oxygen transmittance. For example, the rate of oxygen transmittance through a dry film formed of the copolymer can be less than 2.0 cc $20\mu/m^2$ day atm, or less than 1.5 cc $20\mu/m^2$ day atm, or less than 1.0 cc $20\mu/m^2$ day atm, or less than 0.5 cc $20\mu/m^2$ day atm, or less than 0.2 cc $20\mu/m^2$ day atm as determined for a dry sample at 20 degrees C. In another example, the rate of oxygen transmittance can be less than 0.005 cc $20\mu/m^2$ day, or less than 0.004 cc $20\mu/m^2$ day, or less than 0.003 cc $20\mu/m^2$ day. When a water-soluble vinyl alcohol copolymer with a low rate of oxygen transmittance is used to form a mold member used to cast mold an ophthalmic device, due to the low level of oxygen transmittance of the mold member, it may be possible to cure the ophthalmic device in an oxygen-containing atmosphere without the presence of oxygen in the atmosphere disrupting the curing process. Thus, in one example, the methods of manufacturing of the present disclosure can be methods using mold members formed of the water-soluble vinyl alcohol copolymer having low rates of oxygen transmission and can involve curing the polymerizable composition in the presence of an oxygen-containing or oxygen-rich atmosphere to form the polymeric ophthalmic device, although it is also possible to cure the polymerizable composition in the presence of a low oxygen or essentially oxygen-free atmosphere, such as, for example, an atmosphere rich in nitrogen gas.

The water-soluble vinyl alcohol copolymer can be biodegradable. For example, the water-soluble vinyl alcohol copolymer can have a level of biodegradability of at least 40%, or at least 50%, or at least 60%, after a standing time of about 30 days as determined using test method ISO 14851 with a sample of about 600 ml, about 300 ml of standard testing solution, and a temperature of about 25 degrees C.

The at least one vinyl alcohol copolymer of the present disclosure can be relatively transparent to visible light. When the transparency of the solid, dry copolymer is measured as percent haze, the percent haze of the copolymer can be less than 30%, or less than 27%, or less than 24%, or less than 22%, or less than 20%, or less than 18%.

The at least one vinyl alcohol copolymer of the present disclosure can have a relatively low level of UV light transmittance. The UV light transmittance through a mold member formed of the copolymer can be less than 15% (i.e., more than 85% of the UV light is not transmitted). The UV light transmittance through the mold member can be less than 10%, or less than 5%, or less than 3%. When mold members formed of the copolymer having low UV light transmittance are used in a curing process involving the use of UV light, the level of UV light transmitted into the device-forming cavity may need to be high, and thus a high level of incident UV light may need to be applied to the exterior of the mold member. For example, more than 500 µW, or more than 750 µW, or more than 1000 µW, or more than 1200 µW, or more than 1500 µW of UV light can be applied to the exterior of the mold member during the curing process. As many UV light bulbs are known to function best when operating at higher levels, providing such high incident light levels may allow the UV bulbs to operate more efficiently, increasing bulb life.

The water-soluble vinyl alcohol copolymer, while having good aqueous solubility, can be practically insoluble in one or more organic solvents. The term "organic solvent" refers to an organic substance which has the ability to solvate or dissolve at least one material. In one example, the organic solvent can be used to dissolve the water-soluble vinyl alcohol copolymer. Examples of organic solvents include, without limitation, alcohols, e.g., alkanols, such as ethanol, isopropanol and the like, chloroform, butyl acetate, tripropylene glycol methyl ether, dipropylene glycol methyl ether acetate, and the like and mixtures thereof. For example, the water-soluble vinyl alcohol copolymer can be practically insoluble in ethyl acetate, or can be practically insoluble in benzene, or can be practically insoluble in toluene, or can be practically insoluble in ethyl acetate, benzene and toluene.

The water-soluble vinyl alcohol copolymer can be a thermoplastic vinyl alcohol copolymer, i.e., a vinyl alcohol copolymer that becomes liquid or malleable when heated and freezes to a glassy state when sufficiently cooled, and which can be repeatedly re-melted and re-molded.

The water-soluble vinyl alcohol copolymer be a copolymer can rapidly dissolve in water or an aqueous solution; or can be a copolymer which, when solublized, has a low level of insoluble solids present in the solution; or can be a copolymer which forms solutions which are not prone to excessive foaming; or can be a copolymer which forms solutions having stable viscosities; or can be a copolymer which forms solutions that do not precipitate excessively when subjected to high shear conditions; or can be a copolymer which, when formed into a dry film, has a low rate of oxygen transmittance; or can be a copolymer that is biodegradable; or can be a copolymer that is relatively transparent to visible light in solid form; or can be a copolymer with a relatively low level of transmittance of UV light; or can be a copolymer that is a thermoplastic; or can be any combination thereof.

In one particular example, the water-soluble vinyl alcohol copolymer of the present disclosure can be NICHIGO G-POLYMER™ manufactured by Nippon Gohsei, Osaka, Japan.

The water-soluble vinyl alcohol copolymer can comprise a vinyl alcohol copolymer with high vinyl alcohol content, or with low vinyl alcohol content, i.e., the majority of the units present in the vinyl alcohol copolymer can be units of a type of vinyl alcohol, or a minority of the units present in the vinyl alcohol copolymer can be units of a type of vinyl alcohol, respectively. The water-soluble vinyl alcohol copolymer can be a vinyl alcohol copolymer having a vinyl alcohol unit content greater than or equal to about 95%, greater than or equal to about 90%, greater than or equal to about 85%, greater than or equal to about 80%, greater than or equal to about 75%, greater than or equal to about 70%, greater than or equal to about 65%, greater than or equal to about 60%, greater than or equal to about 55%, greater than or equal to about 50%, greater than or equal to about 45%, greater than or equal to about 40%, greater than or equal to about 35%, greater than or equal to about 30%, greater than or equal to about 25%, greater than or equal to about 20%, greater than or equal to about 15%, greater than or equal to about 10%, greater than or equal to about 5%, or less than or equal to about 5%. The percentage of vinyl alcohol units in the polymer chain can be expressed as on a weight percent basis, or a molar percent basis.

The water-soluble vinyl alcohol copolymer can be a vinyl alcohol copolymer other than an ethylene-vinyl alcohol copolymer (i.e., the water-soluble vinyl alcohol copolymer is not comprised of units of ethylene). The water-soluble vinyl alcohol copolymer can be a vinyl alcohol copolymer essentially free of ethylene units.

One or more of the water-soluble vinyl alcohol copolymers disclosed herein can be used to form at least one molding surface, or mold member, or mold assembly used to cast mold an ophthalmic device. For example, a molding surface of a mold member can be formed by injection molding the water-soluble vinyl alcohol copolymer, by machining the water-soluble vinyl alcohol copolymer, or by both injection molding and machining the vinyl alcohol copolymer. The machining can comprise lathing, or ablating, or both lathing and ablating the water-soluble vinyl alcohol copolymer to form all or a portion of a molding surface.

The at least one mold surface, or mold member, or mold assembly formed of the water-soluble vinyl alcohol copolymer disclosed herein can be a first mold member comprising a molding surface configured to mold an anterior surface of an ophthalmic device. The at least one mold member formed of the water-soluble vinyl alcohol copolymer can be a second mold member comprising a molding surface configured to mold a posterior surface of an ophthalmic device. The at least one mold member formed of the water-soluble vinyl alcohol copolymer can be both a first mold member comprising a molding surface configured to mold an anterior surface of an ophthalmic device, and a second mold member comprising a molding surface configured to mold a posterior surface of an ophthalmic device. The first mold member and the second mold member can be configured to form an ophthalmic device-shaped cavity therebetween when the first mold member and the second mold member are combined as a mold assembly.

As used herein, an ophthalmic device can comprise an ocular insert. An ocular insert is a polymeric device which is, during wear, placed in contact with the conjunctiva or with an anterior ocular surface, or the punctum, or any combination thereof. The anterior ocular surface contacted by the ocular insert during wear can comprise the cornea, or the sclera, or both. In one example, the ocular insert can comprise a punctual plug. An ocular insert may or may not be a transparent device, and may or may not include an optic zone providing vision correction. Optionally, the ocular insert can comprise a drug-delivery device, a diagnostic device, or both. When the ocular insert comprises a drug-delivery device, the drug delivery device can be configured to provide controlled release of a drug over a pre-determined period of time such as, for example, 2 hours, or 12 hours, or 24 hours, or one week, or one month, or more than one month.

The at least one molding surface, or mold member, or mold assembly formed of the water-soluble vinyl alcohol copolymer disclosed herein can be a first mold member comprising a molding surface configured to mold an anterior surface of an ocular insert. The at least one mold member formed of the water-soluble vinyl alcohol copolymer can be a second mold member comprising a molding surface configured to mold a posterior surface of an ocular insert. The at least one mold member formed of the water-soluble vinyl alcohol copolymer can be both a first mold member comprising a molding surface configured to mold an anterior surface of an ocular insert, and a second mold member comprising a molding surface configured to mold a posterior surface of an ocular insert. The first mold member and the second mold member can be configured to form an ocular insert-shaped cavity therebetween when the first mold member and the second mold member are combined as a mold assembly.

As used herein, contact lenses are understood to be polymeric devices configured to be placed or disposed on a cornea of an animal or human eye. Generally, contact lenses comprise a convex anterior surface, and a concave posterior surface which may contact the cornea during wear. Contact lenses can be cosmetic lenses or vision correction lenses or both cosmetic and vision correction lenses. Vision correction lenses include a transparent vision correction optic zone. The vision correction optic zone can be surrounded by a non-vision correction peripheral zone which may also be transparent or may include a region intended to mask, enhance or change eye color or appearance. Cosmetic lenses are lenses intended to mask, enhance or change eye color or appearance, and may or may not be transparent and may or may not include a vision correction optic zone.

The at least one molding surface, or mold member, or mold assembly formed of the water-soluble vinyl alcohol copolymer disclosed herein can be a first mold member comprising a concave molding surface configured to mold an anterior surface of a contact lens. The at least one mold member formed of the water-soluble vinyl alcohol copolymer can be a second mold member comprising a convex molding surface configured to mold a posterior surface of a contact lens. The at least one mold member formed of the water-soluble vinyl alcohol copolymer can be both a first mold member comprising a concave molding surface configured to mold an anterior surface of a contact lens, and a second mold member comprising a convex molding surface configured to mold a posterior surface of a contact lens. The first mold member and the second mold member can be configured to form a contact lens-shaped cavity therebetween when the first mold member and the second mold member are combined as a mold assembly.

In another example, the at least one molding surface, or mold member, or molding assembly formed of the water-soluble vinyl alcohol copolymer can be a single-piece mold member (i.e., a unitary mold member used to mold both an anterior surface and a posterior surface of the ophthalmic device). The single-piece mold member can be a mold member formed in one piece with the device-forming cavity being integral to the mold member. In other words, the device-shaped cavity can be a hollow area integral to the mold member and is not be formed by assembling multiple mold members. The single-piece mold member can be configured such that, after it is formed, at least one port is present in the mold member to allow injection of monomer into the mold. The single-piece mold member can be configured such that, after it is formed, at least one vent is present in the mold member to allow excess monomer to flow out of the mold member during or following injection of monomer into the mold. The single-piece mold member can be formed using techniques such as, for example lost core molding or gas assisted injection molding, which are known to those of ordinary skill in the art. The use of a single-piece mold member can reduce the amount of monomer required to form the ophthalmic device, and, when formed from the water-soluble copolymer, can reduce the physical manipulation required to release the polymeric ophthalmic device from the single-piece mold member as compared to a mold assembly formed from a plurality of mold members, as the single-piece mold member can be dissolved in water to release the polymeric device body, reducing the opportunity for damage to occur to the device as compared to mechanical methods of releasing the device. Additionally, use of a single-piece mold member may allow the manufacture of ophthalmic devices having unusual geometries which would be more difficult to form using a plurality of mold members.

Unlike molding surface(s) or mold member(s) or a mold assembly (i.e., mold(s)) made of unmodified PVOH, the mold(s) made of the water-soluble vinyl alcohol copolymer described herein can be formed by injection molding, or can be formed by compression molding, continuous compression molding, thermoforming, etc. Unlike mold(s) made of modified forms of PVOH, the molds made of the water-soluble vinyl alcohol copolymer can be rapidly and completely dissolved in liquids such as water and aqueous solutions, including water and aqueous solutions at low temperatures.

The process of cast molding contact lens bodies, including silicone hydrogel contact lens bodies, typically begins with the preparation of a pair of mold members (i.e., a first mold member and a second mold member). The mold members can be produced by injection molding a thermoplastic polymer mold material into mold shaped cavities, by lathing the polymer mold material to form the entire mold member, or by a combination of injection molding and lathing, for example, injection molding to form the basic shape of the mold member and then lathing all or part of the lens forming region of the mold member. For example, a first portion of the device-forming molding surface can comprise an injection molded lens-forming molding surface, and a second portion of the device-forming molding surface can comprise a machined device-forming molding surface. In one such example, the first portion of the lens-forming molding surface can comprises a portion of the lens-forming molding surface molding a peripheral zone and edge of a contact lens, and a second portion of the lens-forming molding surface can comprise a portion of the lens-forming molding surface molding an optic zone of a contact lens.

Typically, when cast molding ophthalmic devices having optical zones, two mold members are combined to form a mold assembly. The two mold members are sized and structured to be assembled together to define a device-shaped cavity therebetween. In the one example, for molding a contact lens, each of the two mold members can comprise either an optical quality concave lens forming molding surface used to mold an anterior surface of a lens, or a convex optical quality lens forming molding surface used to mold a posterior surface of a lens. For the purposes of this disclosure, the mold member with a concave molding surface is referred to as a first mold member or a female mold member, and the mold member with a convex molding surface is referred to as a second mold member or a male mold member. The first and second mold members can be structured to form a lens-shaped cavity therebetween when assembled with each other to form a mold assembly. Alternative mold member configurations, such as, for example, mold assemblies comprising more than two mold members or mold members that are shaped or structured differently than described above, can be used with the vinyl alcohol copolymers described herein. Additionally, the mold members can be configured to comprise more than one lens forming region. For example, a single mold member can be configured to comprise a region configured to mold an anterior lens surface as well as a posterior lens surface, i.e., to act as either a female or male mold member.

The water-soluble vinyl alcohol copolymer can be used to form at least one molding surface, or mold member or mold assembly (i.e., at least one mold) for molding polymeric ophthalmic device bodies. The at least one mold can be produced by conventional injection molding procedures known to persons of ordinary skill in the art. For example, a quantity of the water-soluble vinyl alcohol copolymer can be heated to form a molten thermoplastic polymer. The molten thermoplastic polymer can be dispensed into a mold cavity in the shape of an ophthalmic device mold. In one example, the mold cavity can include one or two optical quality contact lens forming molding surfaces. The molding surfaces used to form the optical quality lens-forming molding surfaces of the mold can be provided as components of one or more removable inserts located in a plate or other housing, or can be machined as part of the molding cavity.

In one example, the process settings used to injection mold the water-soluble vinyl alcohol copolymer of the present disclosure content can include:

Melt temperature from about 160° C. to about 250° C.
Barrel temperature from about 160° C. to about 250° C.
Throat temperature from about 30° C. to about 70° C.
Mold tool temperature from about 30° C. to about 95° C.
Holding time from about 1 second to about 5 seconds
Injection speed from about 50 mm/second to about 250 mm/second
Plasticizing speed from about 100 mm/second to about 300 mm/second
Injection pressure from about 50 bar to about 180 bar
Holding pressure from about 10 bar to about 200 bar
Back pressure from about 5 bar to about 25 bar.

For example, at least two of these process settings can be used to injection mold the vinyl alcohol copolymer. In another example, three, four, five, six, seven, eight, nine, ten, or all of these process settings can be used to injection mold the vinyl alcohol copolymer. In one example, the melt temperature can be from about 160° C. to about 220° C., and the barrel temperature from about 160° C. to about 220° C. In another example, the melt temperature can be from about 180° C. to about 250° C., and the barrel temperature from about 180° C. to about 250° C.

The at least one mold member can be produced by a combination of injection molding and machining, for example, lathing or ablating, where the basic shape of the mold is prepared by injection molding, and all or a portion of the device-forming molding surface is prepared by removing a portion of the mold, for example by machining a portion of the mold, such as, for example, all or a part of the region of the mold used to mold an optical zone of an ophthalmic device. In other words, in accordance with the present disclosure, the device-forming molding surfaces of the at least one mold member can be formed completely by injection molding one or more water-soluble vinyl alcohol copolymers, can be formed completely by machining a portion of at least one water-soluble vinyl alcohol copolymer, or can be formed by injection molding at least one water-soluble vinyl alcohol copolymer to form a mold member, a portion of the device-forming molding surface of which is subsequently machined to form the final device-forming molding surface of the water-soluble vinyl alcohol copolymer mold member. Thus, in one example, injection molding the at least one of the first mold member and the second mold member can comprise forming a non-molding portion of at least one of the first mold member and the second mold member by injection molding, and forming a device-forming molding surface of the at least one of the first mold member and the second mold member by machining or lathing or ablating or any combination thereof the non-molding portion of the mold member.

The water-soluble vinyl alcohol copolymer can be used to form at least a device-forming molding surface of a mold member, where at least some of the non-molding regions of the mold member (i.e., regions of the mold which are not used to form a surface of a device body) are formed of a material other than the water-soluble vinyl alcohol copolymer. In one example, a non-molding portion of the mold member can be formed of a material that is essentially insoluble in water or aqueous solutions, such as, for example a metal or polymeric material such as polypropylene. In one example, the non-molding portion can comprise a frame or support for a device-forming molding surface comprising the water-soluble vinyl alcohol copolymer. The water-soluble vinyl alcohol copolymer can be used to form the entire device-forming molding surface, or can be used to form a portion of the device-forming molding surface, such as a layer of a multilayer device-forming molding surface, where the water-soluble vinyl alcohol copolymer layer is the portion or layer of the multilayer device-forming molding surface that directly contacts the polymerizable composition during cast molding. The portion or layer of the device-forming molding surface comprising the water-soluble vinyl alcohol copolymer can be formed using various methods, such as, for example, injection molding or film casting.

Regardless of the method used to form the mold member from the water-soluble vinyl alcohol polymer, the mold member can be used to mold cosmetic contact lenses having a printed design on one of their surfaces. These cosmetic contact lenses may or may not have a vision-correction zone. Prior to placing the polymerizable composition in the mold member, a design of any sort can be placed on one or more of the lens-forming surfaces of one or more of the mold members to be used to form the lens. The design printed on the mold member can be configured to mask the appearance of the eye, change the appearance of the eye, such as, for example, change the appearance of the color of the eye, or enhance the appearance of the eye, such as is done, for example, by a limbal ring.

The design can be printed onto any lens-forming surface of the mold member, including a concave surface or a convex surface. The design can be printed onto the lens-forming surface of the mold member using any printing method, such as, for example, using ink jet printing, using a cliché method, and the like.

The ink or pigment printed onto the mold member can be a water-based ink or pigment vehicle, or can be an organic solvent-based ink or pigment vehicle.

In one example, due to the use of the water-soluble vinyl alcohol copolymer to form the mold member onto which the design is printed, a surface treatment such as, for example, a plasma treatment may not need to be applied to the molding surface in order for the design to be printed with good reproducibility onto the molding surface, although a surface treatment can also be applied. In one example, the ink or pigment vehicle applied to the molding surface of the mold member does not bead up when applied to the molding surface. When the polymerizable composition is placed in contact with the printed molding surface and subsequently cured, demolded and delensed, the printing becomes integrated into the polymeric lens body and remains with the lens body following the demolding and delensing.

When forming the single piece mold or molding surface or mold member by injection molding, the molten thermoplastic polymer in the mold cavity can then be cooled and separated from the molding surface and subsequently moved to a station to receive a volume of a polymerizable composition to be used to form a polymeric device body.

During the process of manufacturing an ophthalmic device, when the mold member used to form the device is a single-piece mold member, the volume of polymerizable composition can be injected directly into the hollow portion of the single-piece mold member. When two or more mold members are used to mold the device, a volume of polymerizable composition is placed in one of the mold members before the mold members are combined to form the mold assembly. Typically this is accomplished by placing a pre-determined quantity of the polymerizable composition onto one of the mold members, such as, for example, placing the polymerizable composition into a concave molding surface of a first mold member. The mold assembly is then assembled by placing another mold member in contact with the first mold member having the polymerizable composition, such as, for example, by placing a convex molding surface of a second mold member in contact with the first mold member such that a device-shaped cavity is formed between the first and second mold members, the device-shaped cavity containing the polymerizable composition. If used, a connection is then formed between first and second mold members by whatever means is being used in order to maintain the mold members in proper alignment during the curing process.

When two or more mold members are combined as a mold assembly, the process of assembling the mold members into a mold assembly can further comprise the step of forming a connection between the mold members or affixing the mold members to each other. The mold members can be permanently affixed to each other, or can be temporarily affixed to each other. The first mold member and the second mold member can be structured to be easily separated after being assembled together without causing substantial damage to the polymeric ophthalmic device body produced in the lens shaped cavity.

In one example, the mold members can be configured to form a mechanical connection based on the shape of elements of the mold members. For example, the mold members can be configured to form an interference fit when pressure is applied to one or both of the mold members. In another example, the mold members can both be threaded so as to form a connection by engaging the interconnecting threads between the mold members. Other examples of mechanical connections can include bores and protrusions between the mold members, or other locking structures.

In another example, the mold members can be affixed to each other using an adhesive substance placed between the mold members. The adhesive substance can comprise or consist of a thermoplastic material. The thermoplastic material can comprise or consist of the same thermoplastic material used to form at least one of the mold members to be affixed to each other. For example, a non-molding portion of one or both of the thermoplastic mold members can be deformed or melted in order to affix the mold members to each other.

In one example, a non-molding portion of one or both of the mold members can be heated in order to melt a portion of one or both of the mold members to form a weld between the mold members in order to adhere the mold members to each other. The weld formed between the mold members can comprise a single weld located in a single non-molding location between the mold members, for example, a single weld in a single spot in a peripheral region surrounding the device-shaped cavity. The weld formed between the mold members can comprise a plurality of welds, each located in a single non-molding location between the mold member, for example, 2 or 3 or 4 or 5 or more individual welds each formed in a single spot in a peripheral region, where the plurality of welds are positioned around the perimeter of the device-shaped cavity. The plurality of welds can be equidistant from each other around the perimeter of the device-shaped cavity, or can be positioned in a non-symmetric pattern. The weld formed between the mold members can comprise a single weld located around the entire perimeter of the lens forming cavity. In such an example, although the thickness of the melted thermoplastic may vary across different portions of the weld, a single continuous weld is present between the mold members in an area which completely encircles the perimeter of the device-shaped cavity formed between the mold members.

In another example, a portion of a solvent capable of dissolving one or both of the mold members can be applied to one or both of the mold members in order to dissolve a non-molding portion of one or both of the mold members in order to meld a surface of one mold member to a surface of the other mold member. As the dissolved mold material re-solidifies, the melded material can act to affix the mold members to each other. The solvent can comprise or consist of water or an aqueous solution. The amount of solvent applied can be a very small portion of the solvent such as, for example, a few microliters. The solvent can be dropped onto a surface to be joined, can be sprayed onto a surface to be joined, can be stamped onto a surface to be joined, etc. For example, one or all of the mold members, prior to being placed together to form the mold assembly, can be contacted by a stamp wetted with the solvent. The stamp can be shaped to conform to the shape of the surface to be joined. For example, the stamp can be ring-shaped such that, when it contacts a non-molding region of one of the mold members surrounding the device-shaped region of the mold member, only the non-molding region of the mold member which is intended to be jointed to the other mold member is wetted. While the solvent is still wet, the mold members can be placed in contact and melded together. Optionally, pressure can be applied to the mold assembly to assist in the process of affixing the mold members to each other. The pressure can be applied for a period of time until the mold members have fully melded to each other. Optionally, heat or air can be applied to the assist in melding the mold members and drying the solvent in order to reduce the amount of time for the meld to form and the melded material to re-solidify, firmly affixing the mold members to each other to form the mold assembly.

In the example were a solvent is used to dissolve a portion of a mold member and form a meld between the mold members, the melded material can be located in a single non-molding location between the mold members, for example, a single spot in a peripheral region surrounding the device-shaped cavity. The melded material can be located in a plurality of non-molding locations between the mold member, for example, 2 or 3 or 4 or 5 or more individual spots in a peripheral region, where the plurality of locations are positioned around the perimeter of the device-shaped cavity. The plurality of locations can be equidistant from each other around the perimeter of the device-shaped cavity, or can be positioned in a non-symmetric pattern. The region of melded material formed between the mold members can be a single continuous region located around the entire perimeter of the device-shaped cavity. In such an example, although the thickness of the melded thermoplastic may vary across different portions of the adhered region, a single continuous region of melded material can be present between the mold members and can completely encircle the perimeter of the device-shaped cavity formed between the mold members.

In another example, an adhesive substance such as a form of glue, contact cement or sealant can be used to form a bond between the mold members. In yet another example, the mold members can be joined using an additional element such as a clip, clamp or bracket. Regardless of the type of connection used between the mold members, the connection is intended to keep the mold members in alignment during the curing process, and can be capable of being released before the demolding process or as part of the demolding process.

When at least one of the molding surfaces or mold members of the mold assembly is formed from a water-soluble material, such as, for example, a water-soluble vinyl alcohol copolymer, the mold members of the mold assembly can be connected in such a manner that the mold members cannot be released from each other except by at least partially dissolving at least one of the mold members of the mold assembly. In other words, the mold assembly, once formed, can be a non-opening mold assembly wherein the polymeric device body is released by dissolving all or part of the mold members comprising the mold assembly.

The single-piece mold member or the mold assembly having the polymerizable composition in the device-shaped cavity is then cured. Curing the polymerizable composition in the device-shaped cavity forms a polymerized reaction product in the shape of the device-shaped cavity, i.e., a polymeric device body. Curing typically comprises application of a form of electromagnetic radiation to the mold assembly including the polymerizable composition in order to cause polymerization of the polymerizable composition in the device-shaped cavity of the mold assembly. The form of electromagnetic radiation can comprise thermal radiation, microwave radiation, visible light, ultraviolet (UV) light, etc. Any combination of two or more forms of electromagnetic radiation, as well as two or more levels of one or more forms of electromagnetic radiation, can be used to cure the mold assemblies. The method of curing is usually matched to the type of initiator used in the polymerizable composition, i.e., a polymerizable composition comprising a UV initiator is usually cured using UV light, and a polymerizable composition comprising a thermal initiator is usually cured using thermal radiation, and usually at a temperature above the initiation temperature of the thermal initiator. Regardless of the method of curing that is used, the temperature during the curing process can be maintained at a temperature below the melting point of the water-soluble vinyl alcohol copolymer, or below the glass transition temperature of the water-soluble vinyl alcohol copolymer. The curing process typically involves curing the single-piece mold or mold assembly until the polymerizable composition has polymerized sufficiently such that the polymeric device body will retain the shape of the device-shaped cavity following demolding and delensing. As such, the curing process may not result in complete reaction of all the polymerizable components of the polymerizable composition.

In one example, microwave radiation can be used to cure the polymerizable composition in a single-piece mold member or in a mold assembly formed from the at least one water-soluble vinyl alcohol copolymer as described herein. Use of microwave radiation to cure the polymerizable composition in a mold formed from the water-soluble vinyl alcohol copolymer can reduce the amount of time required to cure the composition as compared to the use of UV light or thermal radiation (i.e., a heated oven). For example, the time required to cure the polymerizable composition in a mold formed from the water-soluble vinyl alcohol copolymer using microwave radiation can be less than or equal to 30 minutes, or less than or equal to 20 minutes, or less than or equal to 15 minutes, or less than or equal to 10 minutes. In another example, the polymerizable composition can comprise a thermal initiator such as, for example, 2,2'-azobiz(isobutyronitrile) (AIBN, VAZO®-64), and the polymerizable composition can be cured using microwave radiation. In another example, the polymerizable composition can comprise a Comfilcon A polymerizable composition containing a thermal initiator such as, for example, AIBN, and the polymerizable composition can be cured using microwave radiation. In yet another example, the polymerizable composition can be cured using microwave radiation, and the polymeric device body can be wet demolded, or wet delensed, or both wet demolded and wet delensed from the mold member formed from the water-soluble vinyl alcohol copolymer. The wet demolding, or the wet delensing, or the wet demolding and delensing can result in the mold member formed from the water-soluble vinyl alcohol copolymer at least partially dissolving. In a particular example, the yield of polymeric device bodies from a manufacturing process involving using molds formed from the water-soluble vinyl alcohol copolymer, curing using microwave radiation, and wet demolding and delensing can be higher than the yield of the same polymeric device bodies manufactured using the same process but using molds formed from a different material such as, for example, polypropylene, or EVOH.

As at least one of the device-forming molding surfaces (of a molding surface, a mold member or the mold assembly) is formed of a material comprising or consisting of the vinyl alcohol copolymer described herein, during the process of curing the polymerizable composition to form the polymeric device body, the polymerizable composition is in direct contact with the vinyl alcohol copolymer, and at least one surface of the resulting ophthalmic device body is thus formed in direct contact with the vinyl alcohol copolymer. In some examples, when all of the device-forming molding surfaces comprise the vinyl alcohol copolymer, all the surfaces of the ophthalmic device are formed in direct contact with the vinyl alcohol copolymer.

When the ophthalmic device is cast molded in a single-piece mold member formed of the water-soluble vinyl alcohol copolymer, the process of releasing the polymeric ophthalmic device from the single-piece mold member can comprise contacting the single-piece mold member with water or an aqueous solution and dissolving at least a portion of the single-piece mold member.

As used herein, "demolding" refers to the process of separating the molding surfaces or mold members of the mold assembly following curing of the polymerizable composition. As a result of the demolding process, the molding surfaces or mold members are separated from each other, and the device body remains in contact with, or attached to, or adhered to one and only one of the molding surfaces or mold members used to cast mold the device body.

"Dry" demolding processes involve the use of mechanical processes to separate the molding surfaces or mold members of the mold assembly after curing. In dry demolding processes, the mold assembly including the polymeric device body is not contacted with a liquid, such as an organic solvent, water or an aqueous solution during the demolding process, and typically the mold assembly including the polymeric device body has not been exposed to a liquid prior to the dry demolding process. Following a dry demolding process, the polymeric device body remains in contact with one, and only one, of the molding surfaces or mold members used to mold the device body. In one example, a dry demolding process may include squeezing one or more of the molding surfaces or mold members to deform the molding surface(s) or mold member(s) and to separate the molding surfaces or mold members, leaving the polymeric device body in contact with one of the molding surfaces or mold members. If the molding surfaces or mold members of the mold assembly are held together at least in part by an interference fit between the molding surfaces or mold members, a dry demolding process may include applying pressure to one or more of the molding surfaces or mold members in order to push the molding surfaces or mold members away from each other to break the interference fit. If the molding surfaces or mold members of the mold assembly are held together at least in part by a weld between the molding surfaces or mold members, dry demolding may include cutting through or breaking apart the welded material.

"Wet" demolding processes involve application of a liquid to separate the molding surfaces or mold members of the mold assembly after curing. In wet demolding processes, the mold assembly including the polymeric device body is contacted with a liquid, such as an organic solvent, water or an aqueous solution, during the demolding process. Following a wet demolding process, the polymeric device body can remain in contact with one, and only one, of the molding surfaces or mold members used to mold the device body, or can be released from both of the molding surfaces or mold members used to mold the device body. Wet demolding processes may additionally involve the use of mechanical methods of separating the molding surfaces or mold members in addition to application of liquid to the mold assembly, including squeezing one or more of the molding surfaces or mold members to deform the molding surfaces or mold member(s), applying pressure to one or more of the molding surfaces or mold members in order to push the molding surfaces or mold members away from each other to break an interference fit, or cutting through welds or an adhesive holding the mold assemblies together. When an additional mechanical separation step is used, it is typically done after first applying the liquid to the mold assembly, such as, for example, dipping or immersing the mold assembly in a liquid.

As part of a wet or dry demolding process, it may be desired to have the device body remain in contact with a particular molding surface or mold member, such as either the first or the second mold member, following the demolding process. In order to help the device body remain in contact with the desired molding surface or mold member, heat can be applied to the first or second molding surface or mold member, for example, by blowing heated air on the back of the molding surface or mold member. Alternatively, the first or second molding surface or mold member can be chilled, for example by blowing chilled air on the back of the molding surface or mold member or applying a chilled liquid to one of the molding surfaces or mold members. An application of pressure to either the first or second molding surface or mold member before demolding or concurrently with the demolding process can also help the device body to remain in contact with a particular molding surface or mold member (i.e., the first or second molding surface or mold member) following the demolding process. In one example, when it is desired to have the polymeric device body remain in contact with the second molding surface or mold member at the end of the demolding process, heat can be applied to the back of the first molding surface or mold member immediately before or during the demolding process. The heat can be applied at a temperature below the melting point of the molding surface or mold member. The heat can be applied for a short amount of time such as, for example, less than or equal to 15 seconds, or less than or equal to 10 seconds, or less than or equal to 5 seconds.

"Delensing" refers to the process of releasing the device body from the one molding surface or mold member with which the device body remains in contact after the molding surfaces or mold members of the mold assembly have been separated in a demolding process. As used herein, "delensing" may refer to a process involving any ophthalmic device body, including an ocular insert body or a contact lens body.

"Dry" delensing processes involve the use of mechanical processes to release the device body from the one remaining molding surface or mold member with which the device body is in contact following the demolding step. In dry delensing processes, the device body and the one remaining molding surface or mold member with which the device body is in contact are not contacted by a liquid, such as an organic solvent, water or an aqueous solution, as part of the delensing process. While it is possible that a wet demolding process (involving application of a liquid to a mold assembly including a polymeric device body) may be used prior to a dry delensing process, it is more common to use a dry demolding process prior to a dry delensing process. When a dry demolding process and a dry delensing process are used together, the device body has not been exposed to a liquid, for example an organic solvent, water or an aqueous solution, until after the device body has been released from both molding surfaces or mold members of the mold assembly (i.e., released from both the first and second molding surfaces and mold members). In one example, a dry delensing process may involve the use of a vacuum apparatus to lift the polymeric device body from the one remaining molding surface or mold member with which it was in contact following the demolding step. A dry delensing process may also involve squeezing the one remaining molding surface or mold member to at least partially break the bond between the one molding surface or mold member and the lens body. A dry delensing process may involve blowing air between the edge of the device body and the molding surface or mold member to at least partially break the bond between the device body and the molding surface or mold member. A dry delensing process may involve inserting a prying tool between the edge of the device body and the molding surface or mold member to at least partially break the bond between the device body and the molding surface or mold member.

Following dry demolding and dry delensing, the polymeric device bodies may be washed (e.g., rinsed or extracted or hydrated or any combination thereof) either in an organic solvent-based liquid, or in a liquid essentially free of an organic solvent. Alternatively, following dry demolding and dry delensing, the polymeric device body can be placed directly into a package with a packaging solution, sealed, and sterilized.

"Wet" delensing processes involve the application of a liquid such as an organic solvent, water or an aqueous solution to release the device body from the one remaining molding surface or mold member with which the device body is in contact following the demolding step. After or concurrently with application of the liquid, a wet delensing process can further comprise using a vacuum apparatus to lift the polymeric device body from the one remaining molding surface or mold member with which it was in contact following the demolding step. Optionally, a wet delensing process may also include using mechanical means to assist in releasing the device body, such as, for example, squeezing the one remaining molding surface or mold member to at least partially break the bond between the one molding surface or mold member, blowing air between the edge of the device body and the molding surface or mold member, or inserting a prying tool between the edge of the device body and the molding surface or mold member to at least partially break the bond between the device body and the molding surface or mold member.

In one example, when dry demolding and dry delensing processes followed by a washing process using a liquid free of an organic solvent are used, or when wet demolding, wet delensing and washing processes using a liquid free of an organic solvent are used, the resulting device body will not have been exposed to an organic solvent during the manufacturing process. When such a device body which has not been exposed to an organic solvent is subsequently placed into a contact lens package with a packaging solution, sealed and sterilized, the resulting device product will not have been exposed to an organic solvent during its manufacturing process.

As the vinyl alcohol copolymers disclosed herein are water-soluble, due to this solubility, when using molding surface(s) or mold member(s) formed from these water-soluble vinyl alcohol copolymers, it is possible to use wet demolding processes, wet delensing processes, or both wet delensing and demolding processes involving application of an aqueous liquid to at least partially dissolve the water-soluble vinyl alcohol copolymer molding surface(s) or mold member(s). In one example of such a process, the mold assembly, mold member(s) or molding surface(s) including the polymeric device body can be transferred to a tray before application of the liquid. The tray can comprise separate recesses sized and structured to contain the device bodies after the mold assembly, mold member(s) or molding surface(s) are dissolved by the liquid. For example, when the entire mold assembly used to mold the device body is formed entirely of the water-soluble vinyl alcohol copolymer, after curing, the mold assembly including the polymeric device body can be transferred to the tray. In another example, when the molding surfaces of the mold assembly are formed entirely of the water-soluble vinyl alcohol copolymer and the non-molding portions of the mold assembly are formed of a material insoluble in the liquid, the non-molding portions of the mold assembly can be separated from the molding surfaces of the mold assembly, and the molding surfaces of the mold assembly including the polymeric device body can be transferred to the tray. In another example, when the molding surfaces of the mold assembly are formed entirely of the water-soluble vinyl alcohol copolymer and the non-molding portions of the mold assembly are formed of a material insoluble in the liquid, the entire molding assembly, including the portions formed of the insoluble material, can be placed in the tray, and the soluble molding surfaces can be allowed to dissolve, releasing the device body from the mold assembly. The mold portions formed of the insoluble material, as well as the device body, can then be removed from the tray. In yet another example, after demolding, a molding surface or mold member formed entirely of the water-soluble vinyl alcohol copolymer and the attached polymeric device body can be transferred to the tray.

The liquid applied in the wet demolding process, the wet delensing process, or both the wet demolding and delensing process can comprise water or an aqueous solution. In one example, the aqueous solution can comprise an aqueous solution of a processing aid which increases the rate of dissolution of the water-soluble vinyl alcohol copolymer. In another example, the processing aid can be a compound that assists in washing the polymeric device bodies or that assists in the removal of an extractable material from the polymeric device bodies. In yet another example, the processing aid can be a compound that helps protect the device body from damage or deformation during processing, such as, for example, a surfactant, including Tween 80.

The term "surfactant" or refers to a substance which has the ability to reduce the surface tension of water, for example, water or an aqueous solution in which the substance is present. By reducing the surface tension of the water, the surfactant facilitates the water containing the surfactant, when in contact with a polymeric device body which has not previously been subjected to extraction processing with an organic solvent, to more intimately contact the device body and/or more effectively wash or remove at least one material present in the device body from the device body relative to the water without the surfactant or surfactant component. Generally, a surfactant or surfactant component does not act directly on the at least one material to solvate or dissolve the at least one material. Examples of surfactants include, without limitation, zwitterionic surfactants including forms of betaine, non-ionic surfactants including forms of polysorbate such as polysorbate 80, forms of poloxamers or poloxamines, fluorinated surfactants, and the like and mixtures thereof. In one example, one or more surfactants can be incorporated into the polymerizable compositions described herein, in washing liquids described herein, in the packaging solutions described herein, and any combination thereof.

The process of applying the liquid to dissolve the water-soluble vinyl alcohol copolymer molding surface(s), or mold member(s), or mold assembly can include processes which increase the rate of dissolution of the copolymer, or which reduce the foaming or gelation of the solution following dissolution of the copolymer.

In one example, the size or volume of the water-soluble vinyl alcohol copolymer molding surface(s), or mold member(s), or mold assembly can be reduced prior to applying the liquid to dissolve the copolymer, such as, for example, by cutting off or machining away or ablating a portion of the molding surface(s), or mold member(s), or mold assembly.

In another example, before, or during or following or any combination thereof, the step of applying the liquid, the temperature of the liquid can be controlled, for example, in order to maintain the liquid at a temperature which increases the rate of dissolution of the water-soluble vinyl alcohol copolymer, or at a temperature at which the viscosity of the vinyl alcohol copolymer solution remains relatively stable.

In yet another example, the vinyl alcohol copolymer molding surface(s), or mold member(s), or mold assembly can be dissolved using a process or apparatus which cycles fresh solvent over the molding surface(s), or mold member(s), or mold assembly, such as, for example, a Soxhlet apparatus.

During or following the step of applying the liquid, the liquid or the molding surface(s) or mold member(s) or mold assembly can be agitated, for example, to increase the rate of dissolution of the vinyl alcohol copolymer.

During or following the step of applying the liquid, ultrasonic energy can be applied to the liquid, the mold assembly, the mold member(s), or the molding surface(s). In another example, the ultrasonic energy can be applied to the liquid and to a mold assembly, mold member(s), or molding surface(s) contained in a tray.

The liquid applied to the molding surface(s), or mold member(s), or mold assembly can be applied as part of a wet demolding process, or applied to a device body and one mold member as part of a wet delensing process, or applied to a device body and a molding surface as part of a wet delensing process. The temperature of the liquid can be about 90° C. or less, about 80° C. or less, about 70° C. or less, about 60° C. or less, about 50° C. or less, about 40° C. or less, or about 30° C. or less.

The application of the liquid can result in complete dissolution of the molding surface(s) or molding member(s) or mold assembly comprising the water-soluble vinyl alcohol copolymer in about 240 minutes or less, or in about 180 minutes or less, or in about 120 minutes or less, or in about 90 minutes or less, or in about 60 minutes or less, or in about 30 minutes or less, or in about 20 minutes or less. Alternatively, application of the liquid can result in partial dissolution of the molding surface(s) or mold member(s) or mold assembly comprising the vinyl alcohol copolymer, wherein the partial dissolution is sufficient to separate the mold members of the mold assembly (i.e., to demold the mold assembly), to release the lens body from one mold member or from one molding surface (i.e., to delens the lens body), or both demold and delens (i.e., completely release the lens body from all the mold members or molding surfaces used for form it). For example, the application of liquid can result in greater than 10%, 25%, 50%, 75%, or 90% by weight or volume of the mold assembly or mold member(s) or molding surface(s) being dissolved.

As previously discussed, in some examples, by using the water-soluble vinyl alcohol copolymer disclosed herein, demolding, delensing or both demolding and delensing processes involving dissolution of the water-soluble vinyl alcohol copolymer are not severely impacted by some of the problems experienced when dissolving other water-soluble polymers in aqueous solutions. For example, PVOH, when dissolved in aqueous solutions, can create a large amount of foam, gelation of the solution, a cloudy solution, or any combination of these problems. As the presence of foam, gels or a cloudy solution can be disruptive to mechanical processing and manufacturing steps, additional measures and expenses are required to control or eliminate these problems. Solutions of the water-soluble vinyl alcohol copolymers described herein that are produced as part of a wet demolding, delensing or both demolding and delensing process involving dissolution of mold members comprising the vinyl alcohol copolymer in water or aqueous solutions do not produce large volumes of foam, even when the liquid and the mold members are agitated. Further, the solutions do not gel easily, making it possible to conduct the demolding, delensing or both demolding and delensing processes in large tanks or baths where a single volume of liquid is applied to a plurality of lenses and mold members. As the solution does not gel under these conditions, it is possible to easily empty the solution from the tank or bath and re-fill the tank or bath with fresh or recycled liquid. As the solution of the water-soluble vinyl alcohol copolymer in the liquid remains clear, it is possible to observe the lens bodies and the mold members either manually or using an automated system to determine whether or not the lens body has been released from the mold member(s) or molding surface(s), or whether or not the mold member(s) or molding surface(s) have dissolved. As the solution of the water-soluble vinyl alcohol copolymer can have a higher specific gravity than the solvent alone, the solution of the copolymer may sink to the bottom of a tank during a dissolution process. The tank used during the dissolution process can be fitted with a drain and a valve at the bottom of the tank in order to remove all or a portion of the copolymer solution from the tank during or following the dissolution process. The tank used during the dissolution process can be configured to be funnel shaped, in order to direct the heavier copolymer solution to the bottom-most portion of the tank during or following the dissolution process.

Following removal of the copolymer solution formed as part of the manufacturing process, the copolymer solution can be recycled or reclaimed. The recycling or reclaiming process can use the reclaimed copolymer to re-form ophthalmic mold members, or can use the reclaimed copolymer for another purpose. For example, the solvent used to dissolve the copolymer can be evaporated off, resulting in a solid reclaimed copolymer or a more concentrated copolymer solution.

Following release of the polymeric ophthalmic device body from the mold assembly, e.g., from all the mold members and molding surfaces used to cast mold the device body, in one example, the vinyl alcohol copolymer may no longer be present on a surface of the polymeric device body. In other words, once the device body has been released from the at least one mold member comprising the at least one vinyl alcohol copolymer, a layer of the at least one vinyl alcohol copolymer may not remain on a surface of the device body. The release of the device body from the at least one mold member can comprise a dry demolding step or a dry delensing step or a wet demolding step or a wet delensing step. Following release of the device body from the at least one mold member comprising the at least one vinyl alcohol copolymer, a portion of the at least one vinyl alcohol copolymer may remain present in solution, and the device body can be present in the solution. However, when the device body is present in the solution, the solublized portion of the at least one vinyl alcohol copolymer may not be chemically or physically attached or bonded to a surface of the device body, and thus in this example the vinyl alcohol copolymer can be rinsed from the surface of the device body using a solution free of the at least one vinyl alcohol copolymer. When the solubilzed vinyl alcohol copolymer can be rinsed from a surface of the device body in this manner, it is understood that the portion of solublized vinyl alcohol copolymer which may have been in contact with a device body surface while the device body was present in the solution does not constitute a "layer" of the vinyl alcohol copolymer as used herein.

Depending upon the type of device body and the demolding/delensing processes used, following demolding and delensing, the device body may be subjected to one or more washing steps, including washing steps in an organic solvent, an aqueous solution of an organic solvent, water, or an aqueous solution essentially free of an organic solvent. The washing step can be used to clean dirt or debris from the device bodies, to extract materials from the device bodies, or to hydrate the device bodies. For example, a washing step can be used to remove diluents from the device body, to remove unreacted or partially reacted monomers from the device body, or to increase wettability of the device body.

In one example, the washing solution can comprise an organic solvent or an aqueous solution of an organic solvent. The organic solvent can comprise a volatile organic solvent such as, for example, a volatile alcohol. Examples of volatile alcohols can include lower alcohols, such as forms of methanol, ethanol, propanol, etc.

As previously discussed, the term "organic solvent" refers to an organic substance having the ability to solvate or dissolve at least one material. The organic solvent can be used to dissolve unreacted materials, diluents and the like, present in a polymeric device body which has not previously been subjected to extraction processing. In one example, the material is a material that is not soluble or does not dissolve in water or an aqueous solution. In another example, the material is a material that is not as soluble or does not dissolve as much in water or an aqueous solution, i.e., the material has increased solvation in the organic solvent as compared to water or an aqueous solution. Thus, the organic solvent in contact with such an unextracted device body is effective to solvate or dissolve at least one material present in the device body, or to increase the solvation or dissolve to a greater extent the at least one material present in the device body to reduce the concentration of the at least one material in the device body, or to reduce the concentration of the at least one material in the device body as compared to a device body treated with water or an aqueous solution. The organic solvent may be used without dilution, that is 100% organic solvent, or may be used in a composition including less than 100% organic solvent, for example and without limitation, an aqueous solution including an organic solvent. In general, an organic solvent acts, for example, directly acts, on the at least one material to solvate or dissolve the at least one material.

In another example, the washing solution can comprise water or an aqueous solution essentially free of an organic solvent. The aqueous solution essentially free of an organic solvent used to wash the present lenses can include aqueous salt solutions, buffer solutions, surfactant solutions, wetting agent solutions, comfort agent solutions, any combination thereof, and the like. In one example, one or more polymeric wetting agents or comfort agents can be used to wash the present device bodies, or in a packaging solution used with the present device bodies. However, it is understood that the present device bodies can have ophthalmically acceptably wettable surfaces when washed or packaged in an aqueous solution that does not contain any polymeric wetting agents or comfort agents. Thus, while the polymeric wetting agents or comfort agents may be used to increase the wettability of such devices, their wettability is not dependent solely upon the use of such agents.

Following release of the device body from the molding surface(s) or mold member(s) or mold assembly and, if used, one or more optional washing steps, the device body can be placed into a blister package along with a portion of packaging solution. In one example, the blister package can comprise a hydrophobic polymer. The blister package can then be sealed and sterilized, for example, by autoclaving the package under conditions suitable for sterilizing the package. Alternatively, when a water-soluble vinyl alcohol copolymer is used to form the molding surface(s) or mold member(s) or mold assembly, it is possible to place the device body and the mold member(s) or molding surface(s) or mold assembly comprising the water-soluble vinyl alcohol copolymer directly into the blister package with a portion of solution (without the need to demold, delens or both demold and delens the device body before placing it in the blister package), and have the mold member(s) or molding surface(s) or mold assembly comprising the water-soluble vinyl alcohol copolymer dissolve in the packaging solution during or after the manufacturing process.

In one example, when both the first and second mold members are formed entirely of the water-soluble vinyl alcohol copolymer, after curing, the mold assembly including the polymeric device body can be placed into a blister package with a portion of solution, dissolving the mold members of the mold assembly and avoiding the need to perform separate demolding, delensing and lens transfer processes. In another example, when molding surfaces of both the first mold member and the second mold member are formed entirely of the water-soluble vinyl alcohol, after curing, the non-molding portions of the mold members can be removed from the mold assembly, and the molding surfaces and the device body can be placed in a blister package with a portion of solution, dissolving the molding surfaces and avoiding the need to perform separate demolding, delensing and lens transfer processes. In another example, when the one and only one of the first and second mold members to which the device body remains attached following demolding is formed entirely of the water-soluble vinyl alcohol copolymer, after curing and demolding, the one and only one mold member and the attached device body can be placed into the blister package with a portion of solution, dissolving the one and only one mold member and avoiding the need to perform separate delensing and lens transfer processes. In yet another example, when the molding surface of the one and only one of the first and second mold members to which the device body remains attached following demolding comprises a molding surface formed entirely of the water-soluble vinyl alcohol copolymer, after curing, demolding and removing the non-molding portion of the mold member, the molding surface and the attached device body can be placed into the blister package with a portion of solution, dissolving the molding surface and avoiding the need to perform separate delensing and lens transfer processes. In any of the above examples, the solution placed in the package and used to dissolve the water-soluble vinyl alcohol copolymer can comprise a packaging solution, or can comprise a solution which is subsequently removed from the package and replaced with a packaging solution prior to sealing and sterilizing the package.

A device can be used to increase the volume of solution used to dissolve the mold assembly or mold member(s) or molding surface(s) such as the device described in PCT Application No. PCT/US11/28197, which is hereby incorporated by reference in its entirety. Alternatively, the device body and mold assembly or mold member(s) or molding surface(s) can be placed in the blister package with a portion of washing solution which is replaced by packaging solution before the blister package is sealed. Again, a device as described in PCT Application No. PCT/US11/28197 can be used for this purpose.

The mold assembly or mold members(s) or molding surface(s) comprising the water-soluble vinyl alcohol copolymer can dissolve in the portion of solution before the blister package is sealed, after the blister package is sealed, before the blister package is autoclaved, or after the blister package is autoclaved. For example, before sealing the blister package, after sealing the blister package, before autoclaving the blister package, or after autoclaving the blister package, less than about 15%, less than about 10%, less than about 5%, or less than about 1% by weight of the vinyl alcohol copolymer added to the blister package can remain undissolved in the blister package.

In one example, when the molding surface of a mold member is formed entirely of a water-soluble vinyl alcohol copolymer and the non-molding portion of the mold member is formed of a polymer that is insoluble in water and the solution, the non-molding portion of the mold member can be structured to further serve as a blister package. For example, the non-molding portion of the mold member can be formed of a hydrophobic polymer, such as, for example, polypropylene. The non-molding portion of the mold member can be structured to further comprise a cavity to retain a liquid and a flange extending outwardly from the cavity. In an another example, the non-molding portion of the mold member can be configured to serve as a blister package configured to allow optical inspection of a polymeric device body placed in the blister package. The non-molding portion of the mold member can be structured to comprise a cavity to retain a liquid, a flange extending outwardly from the cavity and a bottom wall surface configured to collimate light. Blister packages configured to allow optical inspection of a lens placed in the blister package are described in U.S. Pat. No. 7,477,366, which is hereby incorporated by reference in its entirety.

In the example where the molding surface of a mold member is formed entirely of a water-soluble vinyl alcohol copolymer and the non-molding portion of the mold member is configured to serve as a blister package, the method of manufacturing the ophthalmic device can comprise the step of demolding the mold assembly so that the device body remains in contact with the mold member configured to serve as a blister package. The process can then include adding solution to the cavity of the blister package to dissolve the molding surface formed of the water-soluble vinyl alcohol copolymer and release the device body from the molding surface. The polymeric device body can then be optically inspected in the blister package before the blister package is sealed and sterilized.

In the examples where the mold assembly or mold member(s) or molding surface(s) formed of the water-soluble vinyl alcohol copolymer content are dissolved in the packaging solution sealed in the blister package with the lens body, the water-soluble vinyl alcohol copolymer can comprise an ophthalmically acceptable ingredient present in the packaging solution. In one example, the water-soluble vinyl alcohol copolymer, when dissolved in the packaging solution, can further serve as a wetting agent, a comfort agent, as an agent that prevents the lens body from sticking to the blister package, or any combination thereof.

In one example, the method of manufacturing an ophthalmic device as described herein results in a yield of acceptable polymeric device bodies that is higher than a yield of acceptable polymeric device bodies made using an essentially identical method but using first and second mold members comprising an ethylene vinyl alcohol copolymer instead of the at least one water-soluble vinyl alcohol copolymer of the present disclosure. The yield of acceptable device bodies can be a yield of cosmetically acceptable devices, or a yield of ophthalmically acceptable devices. The yield of acceptable devices can be a yield of devices found to be free of visually detectable defects as determined by manual visual inspection or by automated inspection using an automated inspection system. The yield of acceptable device bodies can be a yield of acceptable devices resulting from a particular processing step, such as, for example, a curing step, or a demolding step, or a delensing step, or a washing step, or a packaging step, or any combination of processing steps.

The water-soluble vinyl alcohol copolymer can be used to cast mold various types of polymerizable compositions. The polymerizable composition can comprise at least one hydrophilic monomer. The polymerizable composition can further comprise at least one crosslinker, or at least one initiator, or at least one tinting agent, or at least one UV blocker, or any combination thereof. The at least one initiator can comprise at least one UV initiator or at least one thermal initiator. In one example, the hydrophilic monomer can comprise a silicone-free monomer such as, for example, 2-hydroxyethyl methacrylate (HEMA). In another example, the polymerizable composition can further comprise at least one silicon-containing monomer. In yet another example, the polymerizable composition can be a polymerizable composition which, when polymerized, forms a hydrogel polymeric ophthalmic device body.

As used herein, the term "hydrogel" refers to a polymeric material, typically a network or matrix of polymer chains, capable of swelling in water or becoming swollen with water. A hydrogel can also be understood to be a material that retains water in an equilibrium state. The network or matrix may or may not be cross-linked. Hydrogels refer to polymeric materials, including ophthalmic devices, ocular inserts and contact lenses that are water swellable or are water swelled. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component. For example, a silicone hydrogel is typically prepared by combining a silicon-containing monomer with conventional hydrophilic hydrogel precursors. A silicone hydrogel ophthalmic device is an ophthalmic device, including a vision correcting contact lens, which comprises a silicone hydrogel material.

The polymerizable composition can be a polymerizable composition capable of forming a silicone hydrogel polymer when polymerized. The silicone hydrogel polymerizable composition can comprise a) at least one silicon-containing monomer and b) at least one hydrophilic monomer. In the silicone hydrogel polymerizable composition, the at least one hydrophilic monomer can comprise a hydrophilic monomer with an N-vinyl group. The at least one hydrophilic monomer can comprise a vinyl amide. The at least one silicon-containing monomer of the silicone hydrogel polymerizable composition can be a silicon-containing monomer having a molecular weight greater than 3,000 daltons. The at least one silicon-containing monomer can comprise at least two silicon-containing monomers, each having different numbers of polymerizable groups and different molecular weights. Optionally, the silicone hydrogel polymerizable composition can further comprise a diluent such as, for example, a form of silicone oil. In a particular example, the silicone hydrogel polymerizable composition can comprise a Comfilcon A polymerizable composition, and the polymerized reaction product can be a Comfilcon A polymeric lens body.

When the polymerizable composition comprises a silicon-containing monomer, the composition can further comprise at least one compatible crosslinking agent. In particular examples, the silicone-containing component may act as both a crosslinker and as a silicone-containing component. With respect to polymerizable compositions as discussed herein, "compatible" components refers to components which, when present in a polymerizable composition prior to polymerization, form a single phase that is stable for a duration of time adequate to allow manufacture of a polymeric lens body from the composition. For some components, a range of concentrations may be found to be compatible. Additionally, when the polymerizable composition is used to form a contact lens, "compatible" components are components which, when polymerized to form a polymeric lens body, produce a lens that has adequate physical characteristics to be used as a contact lens (e.g., adequate transparency, modulus, tensile strength, etc.).

"Molecular weight" in the context of a polymer described herein refers to the nominal average molecular mass of a polymer, typically determined by size exclusion chromatography, light scattering techniques, or intrinsic viscosity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of monomers, including macromers and pre-polymers, or of polymers herein refer to the number average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

The hydrophilicity or hydrophobicity of a substance can be determined using conventional techniques, such as, for example, based on the substance's aqueous solubility. For purposes of the present disclosure, a hydrophilic substance is a substance that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic substance, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

A "monomer" refers to a polymerizable compound, regardless of the molecular weight of the compound. Thus, a monomer can be a low molecular weight monomer, a macromer, or a pre-polymer as described below.

A "low molecular weight monomer" refers to a relatively low molecular weight compound, for example a compound with an average molecular weight less than 700 Daltons that is polymerizable. In one example, a low molecular weight monomer can comprise a single unit of a molecule containing one or more functional groups capable of polymerizing to combine with other molecules to form a polymer, the other molecules being of the same structure or different structures as the low molecular weight monomer.

A "macromer" refers to medium and high molecular weight compounds or polymers, which can contain one or more functional groups capable of polymerization or further polymerization. For example, a macromer can be a compound or polymer with an average molecular weight of from about 700 Daltons to about 2,000 Daltons.

A "prepolymer" refers to a polymerizable or crosslinkable higher molecular weight compound. A prepolymer, as used herein can contain one or more functional groups. In one example, a prepolymer can be a series of monomers or macromers bonded together such that the overall molecule remains polymerizable or crosslinkable. For example, a prepolymer can be a compound with an average molecular weight greater than about 2,000 Daltons.

A "polymer" refers to a material formed by polymerizing one or more monomers, macromers, prepolymers or mixtures thereof. As used herein, a polymer is understood to refer to a molecule that is not capable of being polymerized, but is capable of being crosslinked to other polymers, for example, to other polymers present in a polymerizable composition or during the reaction of monomers, macromers and/or prepolymers to form other polymers in a polymerizable composition.

A "network" of a hydrophilic polymer typically means that crosslinks are formed between polymer chains by covalent bonds or by physical bonds, e.g. hydrogen bonds. A network can include two or more polymeric components, and can include an interpenetrating network (IPN) in which one polymer is physically entangled with a second polymer such that there are few, if any, covalent bonds between them, but the polymers cannot be separated from each other without destroying the network.

An "interpenetrating network" or "IPN" refers to a combination of two or more different polymers, in network form, of which at least one is synthesized (e.g., polymerized) and/or cross-linked in the presence of the other without or substantially without any covalent bonds between them. An IPN can be composed of two kinds of chains forming two separate networks, but in juxtaposition or interpenetrating. Examples of IPNs include sequential IPNs, simultaneous IPNs, and homo-IPNs.

A "pseudo-IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially unextractable from the network.

Hydrophilic Monomers. Hydrophilic monomers, including silicon-free hydrophilic monomers, are included in the polymerizable compositions used to make the present silicone hydrogels. The silicon-free hydrophilic monomers exclude hydrophilic compounds that contain one or more silicon atoms. Hydrophilic monomers can be used in combination with silicon-containing monomers, macromers or prepolymers in the polymerizable compositions to form silicone hydrogels. In silicone hydrogels, hydrophilic monomer components include those that are capable of providing at least about 10% (w/w), or even at least about 25% (w/w) water content to the resulting hydrated lens when combined with the other polymerizable composition components. For silicone hydrogels, the total hydrophilic monomers can be from about 25% (w/w) to about 75% (w/w), or from about 35% (w/w) to about 65% (w/w), or from about 40% (w/w) to about 60% (w/w), of the polymerizable composition.

Monomers that may be included as the hydrophilic monomers typically possess at least one polymerizable double bond, at least one hydrophilic functional group, or both. Examples of polymerizable double bonds include, for example, vinyl, acrylic, methacrylic, acrylamido, methacrylamido, fumaric, maleic, styryl, isopropenylphenyl, O-vinylcarbonate, O-vinylcarbamate, allylic, O-vinylacetyl and N-vinyl lactam and N-vinylamido double bonds. In one example, the hydrophilic monomers are vinyl-containing (e.g., an acrylic containing monomer or a non-acrylic vinyl containing monomer). Such hydrophilic monomers may themselves be used as crosslinking agents.

Hydrophilic vinyl-containing monomers that may be incorporated into the materials of the present lenses include, without limitation, the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester and the like and mixtures thereof. One example of a vinyl-containing monomer is N-vinyl-N-methyl acetamide (VMA). The structure of VMA corresponds to $CH_3C(O)N(CH_3)-CH=CH_2$. Hydrophilic monomers which may be incorporated into the polymerizable composition also include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain examples, hydrophilic monomers including DMA, NVP and mixtures thereof are employed.

In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. One or more non-silicon cross-linking agents that can be used in the polymerizable compositions disclosed herein include, for example, without limitation, allyl (meth)acrylate, or lower alkylene glycol di(meth)acrylate, or poly (lower alkylene) glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate, or diallyl phthalate, or ethylene glycol dimethacrylate (EGDMA), or triethylene glycol dimethacrylate (TEGDMA), or triethylene glycol divinyl ether (TEGDVE), or trimethylene glycol dimethacrylate (TMGDMA), or any combination thereof. In one example, the cross-linking agent can have a molecular weight less than 1500 daltons, or less than 1000 daltons, or less than 500 daltons, or less than 200 daltons. Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

In some examples, one or more of the monomers may comprise crosslinking functionality (i.e., the monomer may be multi-functional). In such cases, the use of an additional crosslinker in addition to the monomer, macromer or prepolymer with crosslinking functionality is optional, and the monomer, macromer or prepolymer with crosslinking functionality may be present in the polymeriziable silicone hydrogel composition in a larger amount, such as, for example, at least about 3% (w/w), at least about 5% (w/w), at least about 10% (w/w), or at least about 20% (w/w).

Useful silicon-containing components comprise polymerizable functional groups such as vinyl, acrylate, methacrylate, acrylamide, methacrylamide, N-vinyl lactam, N-vinylamide, and styryl functional groups. The polymerizable compositions as described herein can be based on a silicon-containing monomer, including a silicon-containing low molecular weight monomer, or a silicon-containing macromer, or a silicone-containing prepolymer, or any combination thereof, and a hydrophilic monomer or co-monomer, and a crosslinking agent. In one example, the polymerizable composition of the present disclosure can comprise at least two silicon-containing monomers, each having a different molecular weight. Examples of silicon-containing components that may be useful in the present lenses can be found in U.S. Pat. Nos. 3,808,178, 4,120,570, 4,136,250, 4,139,513, 4,153,641, 4,740,533, 5,034,461, 5,496,871, 5,959,117, 5,998,498, 5,981,675, and 5,998,498; U.S. Pat. Application Publication Nos. 2007/0066706, 2007/0296914, 2008/0048350, 2008/0269429, and 2009/0234089; and Japanese patent application publication number 2008-202060A, all of which are incorporated in their entireties herein by reference.

The polymerizable compositions for use as described herein may include one or more hydrophobic monomers, including silicon-free hydrophobic monomers. Examples of such silicon-free hydrophobic monomers include, without limitation, acrylic and methacrylic acids and derivatives thereof, including methylmethacrylate, Any combination of two or more hydrophobic monomers may be employed.

Illustrative acrylic monomers which can be used in the polymerizable composition include N,N-dimethylacrylamide (DMA), 2-hydroxyethyl acrylate, glycerol methacrylate, 2-hydroxyethyl methacrylate (HEMA), methacrylic acid, acrylic acid, methylmethacrylate (MMA), ethylene glycol methyl ether methacrylate (EGMA), and any mixtures thereof. In one example, the total acrylic monomer content is in an amount ranging from about 5% (w/w) to about 50% (w/w) of the polymerizable composition used to prepare a silicone hydrogel lens product, and can be present in an amount ranging from about 10% (w/w) to about 40% (w/w), or from about 15% (w/w) to about 30% (w/w), of the polymerizable composition.

Additional Hydrogel Components. The polymerizable compositions used in the lenses and in the methods described herein can also include additional components, e.g., one or more initiators, such as one or more thermal initiators, one or more ultraviolet (UV) initiators, visible light initiators, any combination thereof, and the like, one or more UV absorber agents or compounds, or UV radiation or energy absorber, tinting agent, pigments, release agents, antimicrobial compounds, and/or other additives. The term "additive" in the context of the present disclosure refers to a compound or any chemical agent provided in the present hydrogel contact lens polymerizable compositions or the polymerized hydrogel contact lens products, but which is not necessary for the manufacture of a hydrogel contact lens.

The polymerizable compositions may comprise one or more initiator compounds, i.e., a compound capable of initiating polymerization of a polymerizable composition. Thermal initiators, i.e., initiators having a "kick-off" temperature, can be used. For instance, exemplary thermal initiators that can be employed in the present polymerizable compositions include 2,2'-azobiz(isobutyronitrile) (AIBN, VAZO®-64), 2,2'-azobis(2,4-dimethylpentanenitrile) (VAZO®-52), 2,2'-Azobis(2-methylbutyronitrile) (VAZO®-67), and 1,1'-azobis(cyclohexanecarbonitrile) (VAZO®-88). For VAZO® thermal initiators, the grade number (i.e., 64, 52, 67, 88, etc.) is the Celsius temperature at which the half-life of the initiator in solution is 10 hours. All of the VAZO® thermal initiators described herein are available from DuPont (Wilmington, Del., USA). Additional thermal initiators, including nitrites as well as other types of initiators, are available from Sigma Aldrich. Ophthalmically compatible silicone hydrogel contact lenses can be obtained from polymerizable compositions that comprise from about 0.05% (w/w) to about 0.8% (w/w), or from about 0.1% (w/w) to about 0.6% (w/w), of VAZO®-64 or other thermal initiator.

The polymerizable compositions may also comprise a demolding aid, that is to say, one or more ingredients effective in making more facile removal of the cured contact lenses from their molds. Exemplary demolding aids include hydrophilic silicones, polyalkylene oxides, and any combination thereof. The polymerizable compositions may additionally comprise a diluent selected from the group consisting of hexanol, ethoxyethanol, isopropanol (IPA), propanol, decanol and any combination thereof. Diluents, if employed, are typically present in amounts ranging from about 10% (w/w) to about 30% (w/w). Compositions having relatively higher concentrations of diluents tend to, but do not necessarily, have lower ionoflux values, reduced modulus, and increased elongation, as well as water break up times (WBUTs) greater than 20 seconds. Additional materials suitable for use in making hydrogel contact lenses are described in U.S. Pat. No. 6,867,245, the disclosure of which is incorporated in its entirety herein by reference. In certain examples however, the polymerizable composition is diluent-free.

In a particular example of a polymerizable composition, the composition comprises a first monomer having a first reactivity ratio, and a second monomer having a second reactivity ratio that is less than the first reactivity ratio. As understood by persons or ordinary skill in the art, a reactivity ratio can be defined as the ratio of the reaction rate constant of each propagating species adding its own monomer to the rate constant for its addition of other monomer. Such compositions may also include at least one cross-linking agent having a reactivity ratio similar to the first reactivity ratio or to the second ratio. Such compositions may also include at least two crosslinking agents, the first crosslinking agent having a reactivity ratio similar to the first reactivity ratio, and the second crosslinking agent having a reactivity ratio similar to the second reactivity ratio. In certain examples, the lens precursor compositions may include one or more removable additives. For example, the polymerizable compositions may include one or more compatibilizers, demolding aids, delensing aids, wettability enhancers, and ionoflux reducers which are removable.

Silicone hydrogel contact lenses are based on polymerizable lens formulations that include silicon-containing monomers, including low molecular weight monomers, macromers, prepolymers or any combination thereof, and at least one hydrophilic monomer, as previously described. Some examples of silicone hydrogel contact lens materials include materials having the following USANs: acquafilcon A or aquafilcon B, balafilcon A, comfilcon A, enfilcon A, galyfilcon A, lenefilcon A, lotrafilcon A, lotrafilcon B, senofilcon A, narafilcon A, and filcon II 3. In one example, the lens body with ophthalmically acceptably wettable anterior and posterior surfaces without application of a surface treatment to the lens body, or without the presence of a interpenetrating polymeric network (IPN) of a polymeric wetting agent in the lens body is a comfilcon A silicone hydrogel contact lens body.

Ophthalmic devices comprise bodies that have surfaces, such as an anterior surface and a posterior surface. As used herein, an ophthalmically acceptably wettable ophthalmic device is a device having surfaces that are all ophthalmically acceptably wettable. Wettability refers to the hydrophilicity of one or more surfaces of a device. As used herein, a surface of a device can be considered to be ophthalmically acceptably wettable if the device receives a score of 3 or above in a wettability assay conducted as follows. An ophthalmic device is dipped into distilled water, removed from the water, and the length of time that it takes for the water film to recede from the device surface is determined (e.g., water break up time (WBUT)). The assay grades devices on a linear scale of 1-10, where a score of 10 refers to a device in which a drop takes 20 seconds or more to fall from the device. A device having a WBUT of more than 5 seconds, such as at least 10 seconds or more desirably at least about 15 seconds, can be a device having ophthalmically acceptably wettable surfaces. Wettability can also be determined by measuring a contact angle on one or both device surfaces. The contact angle can be a dynamic or static contact angle, a sessile drop contact angle, a pendant drop contact angle, or a captive bubble contact angle. Lower contact angles generally refer to increased wettability of a device surface. For example, an ophthalmically acceptably wettable surface of a device can have a contact angle less than about 120 degrees. However, in certain examples, the devices can have a contact angle no greater than 90 degrees, and in further examples, the device can have an advancing contact angle less than about 80 degrees.

The ophthalmic devices cast molded using a water-soluble vinyl alcohol copolymer disclosed herein can have ophthalmically acceptably wettable surfaces when fully hydrated, and may not require application of a surface treatment or the presence of an IPN or pseudo-IPN of a polymeric wetting agent in the device body in order for the lens to have ophthalmically acceptably wettable surfaces. However, application of a surface treatment to the device or the presence of an IPN or pseudo-IPN of a polymeric wetting agent in the device body can be used to further increase the wettability of the device surfaces above a level that is considered ophthalmically acceptably wettable.

An "ophthalmically compatible silicone hydrogel device" refers to a silicone hydrogel ophthalmic device, such as a contact lens, that can be worn on a person's eye without the person experiencing or reporting substantial discomfort, including ocular irritation and the like. When the device is a contact lens, such lenses often have an oxygen permeability, a surface wettability, a modulus, a water content, an ionoflux, a design, and any combination thereof, which permit the lenses to be comfortably worn on a patient's eye for extended periods of time, such as for at least a day, at least a week, at least two weeks, or about a month without requiring removal of the lens from the eye. Typically, ophthalmically compatible silicone hydrogel devices do not cause or are not associated with significant corneal swelling, corneal dehydration ("dry eye"), superior-epithelial arcuate lesions ("SEALs"), or other significant discomfort. Ophthalmically compatible silicone hydrogel contact lenses meet clinical acceptability requirements for daily wear or extended wear contact lenses.

Ophthalmically compatible silicone hydrogel devices have ophthalmically acceptably wettable surfaces, although a device with ophthalmically acceptably wettable surfaces may not necessarily be ophthalmically compatible. A silicone hydrogel contact device having an "ophthalmically acceptably wettable surface" can be understood to refer to a silicone hydrogel device that does not adversely affect the tear film of a device wearer's eye to a degree that results in the device wearer experiencing or reporting discomfort associated with placing or wearing the silicone hydrogel device on an eye.

A method of manufacturing ophthalmic devices, for example, silicone hydrogel contact lenses, is illustrated in FIG. 1. In accordance with the present disclosure, all of the steps illustrated in FIG. 1, or a subset of the steps illustrated in FIG. 1 can comprise a method of manufacturing contact lenses. Items which serve as inputs, outputs or both inputs and outputs of the steps of FIG. 1 are illustrated in FIG. 2.

FIG. 1 includes a step 102 of providing a water-soluble vinyl alcohol copolymer of the present disclosure. The water-soluble vinyl alcohol copolymer is illustrated in FIG. 2 as element 202.

Step 104 of FIG. 1 illustrates the step of using the water-soluble vinyl alcohol copolymer to form a single-piece mold member, or to form at least one of a first mold member and a second mold member, or to form at least one molding surface of at least one of a first mold member and a second mold member. Element 204 of FIG. 2 illustrates the resulting mold member(s) or molding surface(s) comprising the water-soluble vinyl alcohol copolymer.

FIG. 1 also includes a step 106 of placing a polymerizable composition on or in a mold member or molding surface. In reference to the present disclosure, the polymerizable composition can be understood to be a polymerizable composition, such as, for example, a silicon-containing polymerizable composition capable of forming a silicone hydrogel polymer when polymerized. The polymerizable composition is illustrated in FIG. 2 as element 206. The polymerizable composition may be understood to be a pre-polymerized or pre-cured composition suitable for polymerization.

Typically, the polymerizable composition is not polymerized before curing or polymerization of the composition. However, polymerizable compositions may be partially polymerized before undergoing a curing process. In some examples, the polymerizable composition may comprise a polymer component which becomes crosslinked with other components of the polymerizable composition during the curing process. The polymeric component can be wetting agent or comfort agent. Alternatively, the polymeric component can be a polymeric component which is not a polymeric wetting or comfort agent, which does not form an interpenetrating polymeric network or pseudo-IPN in the lens body, or which is neither a polymeric wetting or comfort agent and does not form an IPN or pseudo-IPN in the lens body.

The present polymerizable compositions can be provided in containers, dispensing devices, or mold members prior to a curing or polymerization procedure, as described herein. Referring back to FIG. 1, in step 106, the polymerizable composition is placed on a device-forming molding surface (i.e., a region used to mold a portion of an ophthalmic device such as a lens surface) of a female mold member or of a male mold. The female mold member can be understood to be a first mold member or an anterior mold member, and the male mold member can be understood to be a second mold member or a posterior mold member. For example, the female mold member comprises a molding surface that defines the anterior or front surface of a lens produced from the lens mold. The second mold member may be understood to be a male mold member or a posterior mold member. For example, the second mold member includes a molding surface that defines the posterior surface of a device such as a lens produced in the mold member (e.g., the second or male mold member can have a convex lens forming molding surface).

Further in reference to the present disclosure, at least one of the first and second mold members, or a molding surface of at least one of the first and second mold members comprises, includes, includes a major amount of, consists essentially of, or consists of at least one water-soluble vinyl alcohol copolymer as described herein. In one example, the mold member(s) or molding surface(s) as described herein have been produced to have molding surfaces with sufficient degrees of polarity to produce silicone hydrogel contact lenses having ophthalmically acceptably wettable surfaces. The water-soluble vinyl alcohol copolymer can have a polarity from about 1% to about 70%, or from about 1% to about 50%, or from about 1% to about 10%, or from about 10% to about 45%, or from about 20% to about 40%, or from about 30% to about 45%, or from about 20% to about 30%.

The average polarity of the polymer can be determined based on the Owens-Wendt-Rabel-Kaebel model, where the contact angle of the thermoplastic polymer is determined using a number of different liquids of known polarities. The Owens-Wendt-Rabel-Kaebel equation can be written in the form of a linear equation, where y is calculated based on the observed contact angle of each of the different liquids with the polymer (θ) and x is calculated based on the known polar ($\sigma_L^P$) and disperse ($\sigma_L^D$) components of the total surface energy ($\sigma_L^T$) of each of the different liquids. The data points from the different liquids (x,y) can be plotted, and the linear regression of the plot can then be used to determine the slope (m) and y-intercept (b). The calculated slope and y-intercept can then be used to calculate the polar ($\sigma_S^P$) and disperse ($\sigma_S^D$) components of the total surface energy of the polar thermoplastic polymer ($\sigma_S^T$, where $\sigma_S^T = \sigma_S^P + \sigma_S^D$).

The Owens-Wendt-Rabel-Kaebel Equation in the form of a linear equation:

$$\frac{\sigma_L(\cos\theta + 1)}{2\sqrt{\sigma_L^D}} = \frac{\sqrt{\sigma_S^P}\sqrt{\sigma_L^P}}{\sqrt{\sigma_L^D}} + \sqrt{\sigma_S^D}$$

$$\text{where } y = \frac{\sigma_L(\cos\theta + 1)}{2\sqrt{\sigma_L^D}},\ m = \sqrt{\sigma_S^P},\ x = \frac{\sqrt{\sigma_L^P}}{\sqrt{\sigma_L^D}},\ \text{and } b = \sqrt{\sigma_S^D}.$$

Examples of the liquids with different polarities which can be used to determine average polarity of the polymer include, but are not limited to, deionized water, diiodomethane, dimethyl sulfoxide (DMSO), and formamide. In selecting the liquids with different polarities, ideally, a number of liquids having a range of polarities based on the liquid's polar component ($\sigma_L^P$) of total surface energy would be selected, rather than selecting a number of liquids with different total surface energies ($\sigma_L^T$). Using this method, the average polarity of the polymer is calculated by dividing the calculated polar component ($\sigma_S^P$) of total surface energy for the polymer by its calculated total surface energy ($\sigma_S^T$) and multiplying by 100 to obtain the percent polarity.

To form a mold assembly, the first mold member is placed in contact with a second mold member, forming a device-shaped cavity in the space between the first mold member and the second mold member. The method illustrated in FIG. 1 includes a step 108 of forming a contact lens mold assembly by placing two contact lens mold members in contact with each other to form a lens-shaped cavity therebetween. For example, with reference to FIG. 2, following execution of step 108, the polymerizable silicone hydrogel composition 206 is located in the contact lens-shaped cavity.

At step 110, the method illustrated in FIG. 1 includes curing the polymerizable composition to form a polymeric device body which is contained in a mold assembly, as illustrated in FIG. 2 as element 208. At this point in the process, the polymeric lens body has not been exposed to a liquid. In one example the polymeric lens body can be a polymerized silicone hydrogel contact lens body. During curing, the components of the polymerizable composition polymerize to form a polymeric lens body. Thus, the curing may also be understood to be a polymerizing step. The curing 110 can include exposing the polymerizable lens precursor composition to a form of electromagnetic radiation effective in polymerizing the components of the lens precursor composition. For example, the curing 110 can include exposing the polymerizable composition to polymerizing amounts of heat, microwave radiation or ultraviolet (UV) light, among other forms of electromagnetic radiation. The curing 110 can also include curing the compositions in an oxygen-free or nearly oxygen-free environment. For example, the curing 110 can occur in the presence of nitrogen or other inert gases. The curing 110 can be effective to fully polymerize the polymerizable composition, or can polymerize the polymerizable composition to a level such that the lens body when processed (e.g., demolded, delensed, washed, packaged, sterilized, etc.) is capable of retaining its molded shape adequately to serve as a contact lens.

A polymeric device body which has not been exposed to a liquid can be present at various stages in the manufacturing process, depending upon the types of demolding and delensing processes used, and whether or not one or more optional washing steps are performed. For example, a polymeric lens body which has not been exposed to a liquid can be a polymeric lens body prior to undergoing a wet demolding process, or a wet delensing process, or a wet demolding and delensing process, or an optional washing process, or any combination thereof. For example, the washing process can be a cleaning process to remove dust or debris, or an extraction process to remove a portion or substantially all of one or more extractable components from the polymeric lens body, or a hydration process to partially or fully hydrate the hydrogel lens body, or any combination thereof. For example, the polymeric lens body which has not been contacted by a liquid can comprise a lens body present in a lens shaped cavity of a mold assembly or of two molding surfaces after a curing process, or can comprise a lens body in contact with one and only one mold member following a dry demolding process, or can comprise a contact lens body in a tray or other device following dry delensing and dry delensing processes. The polymeric lens body which has not been exposed to a liquid can include a lens forming component, such as a silicon-containing polymeric network or matrix in the shape of a lens, and a removable component that can be removed from the lens body following polymerization. The removable component can be understood to include unreacted monomers, oligomers, partially reacted monomers, or other agents which have not become covalently attached or otherwise immobilized relative to the lens-forming component. The removable component can also be understood to include one or more additives, including diluents, that can be removed from the polymerized lens product during a cleaning, extraction, or hydration procedure, as discussed herein. Thus, materials of the removable component can include linear uncross-linked or slightly cross-linked or branched polymers of extractable materials that are not cross-linked to or otherwise immobilized relative to the polymer backbone, network, or matrix of the lens body.

After curing the polymerizable compositions, the method illustrated in FIG. 1 includes a step 112 of separating the polymeric device body from the mold members of the mold assembly. In one example, the process of separating the polymeric lens body from the mold member can comprise a demolding process resulting in the polymeric lens body remaining in contact with one, and only one, mold member of the mold members used to form the polymeric lens body. Following the demolding process, the polymeric lens body is located on, or remains in contact with, just one of the mold members of the mold assembly. The one and only one mold member with which the polymeric lens body remains in contact following demolding can be the mold member 204 formed using the vinyl alcohol copolymer 202, or can be a different mold member. When the step 112 of separating the polymeric lens body from the mold members comprises a demolding process, the step of separating can further include a delensing step releasing the polymeric lens body from the one and only one mold member with which it remained in contact following the demolding process. The polymeric lens body can be delensed from the male mold member or the female mold member, depending on which mold member the polymeric lens body remains in contact with following the demolding process. Alternatively, the step 112 can comprise a combination demolding and delensing process, where the lens body is released simultaneously from all of the mold members used to form it. When at least one of the mold members or molding surfaces used to form the lens body comprises a water-soluble vinyl alcohol copolymer, the separating process can involve applying a liquid to the lens body and at least one mold member or molding surface (in the form of a mold assembly, a single mold member, a pair of molding surfaces or a single molding surface, the molding surface(s) being either in contact with, or separated from, the non-molding portion(s) of the mold member(s)) to at least partially dissolve the water-soluble vinyl alcohol copolymer and thereby release the lens body from the mold assembly, single mold member or molding surface(s). The liquid used in a wet separation process can comprise water or an aqueous solution.

The method illustrated in FIG. 1 optionally includes a step 114 of washing the device body. The washing step can comprise contacting a polymeric lens body with a liquid, for example an organic solvent, an organic solvent solution, water or an aqueous solution free of an organic solvent, to clean dust or debris from the lens body, or to extract the lens body to remove extractable materials from the lens body, or to fully or partially hydrate the lens body, or any combination thereof. In one example, the washing step 114 can comprise a washing step to remove or dilute the liquid used during a wet demolding process, a wet delensing process, or both. The washing step 114 results in a cleaned, extracted or hydrated lens body 210, as shown in FIG. 2. The washing step 114 can optionally be conducted on a mold assembly including a polymeric lens body, a polymeric lens body remaining in contact with one mold member, a polymeric lens body which has been fully released from all the molds used to form it, and can be conducted repeatedly during the manufacturing process.

The washing step 114 can optionally include a step of hydrating the polymeric device body. The hydrating step can include contacting a polymeric lens body or one or more batches of such polymeric lens bodies with water or an aqueous solution to form a hydrated lens product, such as, for example, a silicone hydrogel contact lens. The hydration step can fully or partially hydrate the lens body. In one example, the polymeric lens body which is hydrated in the hydration step is a delensed polymeric lens body which has not been contacted by a liquid prior to the hydration step, or can comprise a polymeric lens body which has previously been contacted by a liquid.

After the separating step 112, and the optional washing step 114, the method illustrated in FIG. 1 can optionally include a step 116 of packaging the device body to produce a packaged ophthalmic device product 212. For example, a lens body can be placed in a blister pack, vial or other suitable container along with a volume of a packaging liquid, such as a saline solution, including buffered saline solutions. In one example, the washing step 114 and packaging step 116 can be conducted simultaneously by placing a polymeric lens body, including a polymeric lens body which has not previously been contacted by a liquid, in a blister package or container with a portion of packaging liquid which serves as both a packaging solution and a washing solution. In another example, the separating and packaging step can be conducted simultaneously by placing a polymeric lens body in contact with a mold assembly, two molding surfaces of a mold assembly, a mold member, or a molding surface in a blister package or container with a portion of packaging liquid which serves to release the lens body by dissolving the vinyl alcohol copolymer mold member(s) or molding surface(s).

Optionally, the method illustrated in FIG. 1 can further comprise one or more inspection steps 118. In the example illustrated in FIG. 1, the inspection step is conducted following the packaging step, before the package is sealed and sterilized, although the one or more inspection steps can be conducted at any point in the process, either before curing or after curing, on a dry device body or a wet device body. For example, an inspection can be performed on one or more mold members to determine the acceptability of the molding surfaces, can be performed on a mold member following placing of the polymerizable composition to detect the presence of bubbles in the polymerizable composition, on a dry lens following curing to determine the acceptability of the dry lens body, or on a wet lens body following separating, washing or packaging to determine the acceptability of the wet lens body. The result of optional inspection step(s) 118 as illustrated in FIG. 1 is a packaged inspected body 214, but in other processes can comprise an inspected mold member, an inspected polymerizable composition in a mold member, an inspected dry lens body, or an inspected wet lens body.

Following the step 116 of packaging the device body, the blister pack or container containing the packaged device body 212 can be sealed, and subsequently sterilized, as shown in optional step 120 of FIG. 1, to produce a sterilized package comprising an ophthalmic device product such as, for example, a contact lens. The packaged device body can be exposed to sterilizing amounts of radiation, including heat such as by autoclaving, gamma radiation, e-beam radiation, ultraviolet radiation, and the like. Depending upon the previous process steps used, the sterilization process can also serve to partially or fully extract, fully hydrate, or both extract and hydrate the packaged device body, or to dissolve the mold member(s) or molding surface(s) comprising the water-soluble vinyl alcohol copolymer.

The following non-limiting Examples illustrate certain aspects of the present methods and devices.

Example 1

Comparative, Theoretical

A quantity of ethylene-vinyl alcohol copolymer is provided in granular or pellet form. A portion of the polymer is processed by conventional injection molding into first and second contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is below about 65%.

Example 2

Theoretical

A quantity of water-soluble vinyl alcohol copolymer is provided in granular or pellet form. A portion of the polymer is processed by conventional injection molding into contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal, microwave or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is greater than about 75%. When the manufacturing process involving minimal handling of the lens body, where the mold assembly is placed in the blister package and the lens body is demolded and delensed by dissolving the mold assembly in the blister package, followed by washing the lens body in the blister package, the yield of acceptable lens bodies is greater than about 85%.

Example 3

Theoretical

A quantity of Nichigo G-Polymer™ vinyl alcohol copolymer is provided in granular or pellet form. A portion of the polymer is processed by conventional injection molding into male and female contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are simultaneously wet demolded and delensed by placing the mold assembly including the polymeric lens body into a tray, and applying liquid to the mold assembly to at least partially dissolve the vinyl alcohol copolymer, thereby releasing the lens body from both molds of the mold assembly. Optionally, the mold assemblies, the mold members, or the liquid can be agitated during the demolding and delensing steps. The released lens bodies are subsequently transferred to a blister package with packaging solution, and are sealed and sterilized.

What is claimed is:

1. A method of manufacturing an ophthalmic device, comprising:
   (a) providing at least one unmodified water-soluble vinyl alcohol copolymer and wherein the at least one unmodified water-soluble vinyl alcohol copolymer is a vinyl alcohol copolymer essentially free of ethylene units;
   (b) using the at least one unmodified water-soluble vinyl alcohol copolymer to form at least one of a first mold member and a second mold member, the first mold member comprising a molding surface configured to mold an anterior surface of the ophthalmic device and the second mold member comprising a molding surface configured to mold a posterior surface of an ophthalmic device, the first mold member and the second mold member configured to form an ophthalmic device-shaped cavity therebetween when combined as a mold assembly;
   (c) placing a polymerizable composition comprising at least one hydrophilic monomer in the first mold member or the second mold member;
   (d) assembling the mold assembly by contacting the first mold member and the second mold member so as to form the ophthalmic device-shaped cavity therebetween with the polymerizable composition contained in the ophthalmic device-shaped cavity of the mold assembly; and
   (e) curing the polymerizable composition in the mold assembly to form a cast-molded polymerized reaction product in the ophthalmic device-shaped cavity of the mold assembly, the polymerized reaction product comprising a polymeric ophthalmic device body.

2. The method of claim 1, wherein the at least one unmodified water-soluble vinyl alcohol copolymer is a copolymer for which 50 grams or more of the copolymer are visibly soluble in 1 liter of deionized water at 20 degrees C.

3. The method of claim 1, wherein a sample of the at least one unmodified water-soluble vinyl alcohol copolymer, when agitated, dissolves at least 40% (wt/wt) in 1 liter of deionized water at 30 degrees C. in 20 minutes or less.

4. The method of claim 1, wherein a sample of the at least one unmodified water-soluble vinyl alcohol copolymer dissolves in deionized water leaving less than 15% (wt/wt) of the sample remaining as insoluble solids once the soluble portion of the sample has dissolved.

5. The method of claim 1, wherein a solution of the at least one unmodified water-soluble vinyl alcohol copolymer has a viscosity which varies less than about 20% when stored at a temperature of about 90° C. or less over a period of at least about 12 hours.

6. The method of claim 1, wherein a rate of oxygen transmittance through a dry film formed of the at least one unmodified water-soluble vinyl alcohol copolymer is less than 2.0 cc 20 μ/m² day atm.

7. The method of claim 1, wherein a level of biodegradability of the at least one unmodified water-soluble vinyl alcohol copolymer is at least 40% after a standing time of about 30 days as determined using test method ISO 14851 with a sample of about 600 ml, about 300 ml of standard testing solution, and a temperature of about 25 degrees C.

8. The method of claim 1, wherein a dry, solid sample of the at least one unmodified water-soluble vinyl alcohol copolymer has a percent haze of less than 30%.

9. The method of claim 1, wherein the at least one unmodified water-soluble vinyl alcohol copolymer has a level of UV light transmittance less than 15%.

10. The method of claim 1, wherein the step of using the at least one unmodified water-soluble vinyl alcohol copolymer to form at least one of the first mold member and the second mold member comprises completely forming a molding surface of at least one of the first mold member and the second mold member by injection molding.

11. The method of claim 10, wherein the process of injection molding the at least one unmodified water-soluble vinyl alcohol copolymer uses a process setting selected from the group consisting of: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar, and any combination thereof.

12. The method of claim 1, wherein the step of using the at least one unmodified water-soluble vinyl alcohol copolymer to form at least one of the first mold member and the second mold member comprises using the at least one unmodified water-soluble vinyl alcohol copolymer to form a molding surface on the at least one of the first mold member and the second mold member, a non-molding region of the at least one of the first mold member and the second mold member being formed of a second material, and wherein the step of placing the polymerizable composition in the first mold member or the second mold member comprises placing the polymerizable composition in direct contact with the molding surface comprising the at least one unmodified water-soluble vinyl alcohol copolymer.

13. The method of claim 1, wherein the method further comprises the step of separating the mold assembly following the curing, and the separating results in the polymeric ophthalmic device body remaining in contact with one and only one of the first mold member and the second mold member, the one and only one of the first mold member and the second mold member being the at least one of the first mold member and the second mold member comprising the at least one unmodified water-soluble vinyl alcohol copolymer, or the separating results in the ophthalmic device body being released from both the first mold member and the second mold member.

14. The method of claim 13, wherein the step of separating the cured mold assembly comprises applying a liquid to the at least one of the first mold member and the second mold member comprising the at least one unmodified water-soluble vinyl alcohol copolymer, and results in the at least one of the first mold member and the second mold member comprising the at least one unmodified water-soluble vinyl alcohol copolymer at least partially dissolving in the liquid.

15. The method of claim 1, wherein the method further comprises the step of placing the mold assembly including the polymeric ophthalmic device body in the ophthalmic device-shaped cavity in a blister package with a packaging solution, and sealing and sterilizing the package, wherein the mold assembly is fully dissolved in the packaging solution following sterilization.

* * * * *